United States Patent
Ni et al.

(10) Patent No.: US 11,646,778 B2
(45) Date of Patent: May 9, 2023

(54) METHOD AND APPARATUS FOR CONTROLLING BEAM ADAPTIVELY IN WIRELESS COMMUNICATION SYSTEM

(71) Applicant: SAMSUNG ELECTRONICS CO., LTD., Suwon-si (KR)

(72) Inventors: Hao Ni, Beijing (CN); Meifang Jing, Beijing (CN); Shoufeng Wang, Beijing (CN); Seho Kim, Suwon-si (KR); Junyi Yu, Beijing (CN); Jiajia Wang, Beijing (CN); Xiaohui Yang, Beijing (CN); Yi Zhao, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 17/132,916

(22) Filed: Dec. 23, 2020

(65) Prior Publication Data
US 2021/0203396 A1    Jul. 1, 2021

(30) Foreign Application Priority Data
Dec. 26, 2019    (CN) .......................... 201911370664.6

(51) Int. Cl.
*H04B 7/06*     (2006.01)
*H04B 7/0456*   (2017.01)
*H04B 7/0408*   (2017.01)

(52) U.S. Cl.
CPC ......... *H04B 7/0695* (2013.01); *H04B 7/0408* (2013.01); *H04B 7/0456* (2013.01); *H04B 7/0617* (2013.01)

(58) Field of Classification Search
CPC ........... H04W 72/042; H04W 72/0413; H04W 72/04
(Continued)

(56) References Cited

U.S. PATENT DOCUMENTS 5,890,067 A * 3/1999 Chang .................. H04W 16/28
                                                    455/442
6,104,930 A * 8/2000 Ward .................... H04W 16/28
                                                    455/562.1
(Continued)

FOREIGN PATENT DOCUMENTS

CN    108337688 A    7/2018
CN    108668524 A    10/2018
(Continued)

OTHER PUBLICATIONS

International Search Report (PCT/ISA/210) and Written Opinion (PCT/ISA/237) issued by the International Searching Authority in International Application No. PCT/KR2020/019108, dated Apr. 9, 2021.
(Continued)

*Primary Examiner* — Sam K Ahn
*Assistant Examiner* — Gina M McKie
(74) *Attorney, Agent, or Firm* — Sughrue Mion, PLLC

(57) ABSTRACT

A method for controlling a beam in a cell, includes obtaining traffic distribution data of a plurality of beam areas included in the cell, obtaining a total number of a plurality of beams for a beam area among the plurality of the beam areas, based on the obtained traffic distribution data, and obtaining a beam width of one among the plurality of beams for the beam area, based on the obtained total number of the plurality of beams. The method further includes obtaining, from a candidate beam set, candidate beams for the beam area, based on the obtained total number of the plurality of beams and the obtained beam width of the one among the plurality of beams, and obtaining, from the obtained candidate beams, multiple beams for the beam area, based on a distance between the obtained candidate beams and the beam area.

20 Claims, 28 Drawing Sheets

(58) Field of Classification Search
USPC .......................................................... 370/329
See application file for complete search history.

(56) References Cited

U.S. PATENT DOCUMENTS

| | | |
|---|---|---|
| 6,473,447 B1 | 10/2002 | Strich et al. |
| 9,654,201 B2 | 5/2017 | Angeletti et al. |
| 11,075,672 B2 | 7/2021 | Liang et al. |
| 2005/0272472 A1 | 12/2005 | Goldberg et al. |
| 2006/0009232 A1 | 1/2006 | Vakil et al. |
| 2013/0090126 A1 | 4/2013 | Xing et al. |
| 2016/0381678 A1 | 12/2016 | He et al. |
| 2018/0048360 A1 | 2/2018 | Athley et al. |
| 2019/0124521 A1 | 4/2019 | Yang et al. |
| 2019/0208426 A1* | 7/2019 | Roos .................. H04B 7/18578 |
| 2020/0045606 A1 | 2/2020 | Wang et al. |
| 2020/0053704 A1* | 2/2020 | Kim .................... H04W 74/006 |

FOREIGN PATENT DOCUMENTS

| | | | |
|---|---|---|---|
| KR | 10-2016-0117577 A | 10/2016 | |
| KR | 10-1870767 B1 | 6/2018 | |
| KR | 10-2019-0126188 A | 11/2019 | |
| WO | WO-9617487 A1 * | 6/1996 | ............... H01Q 3/24 |
| WO | 2019174745 A1 | 9/2019 | |

OTHER PUBLICATIONS

European Search Report dated Sep. 28, 2022 issued by the European patent Office in App No. 20904336.3.

* cited by examiner

CASE 2

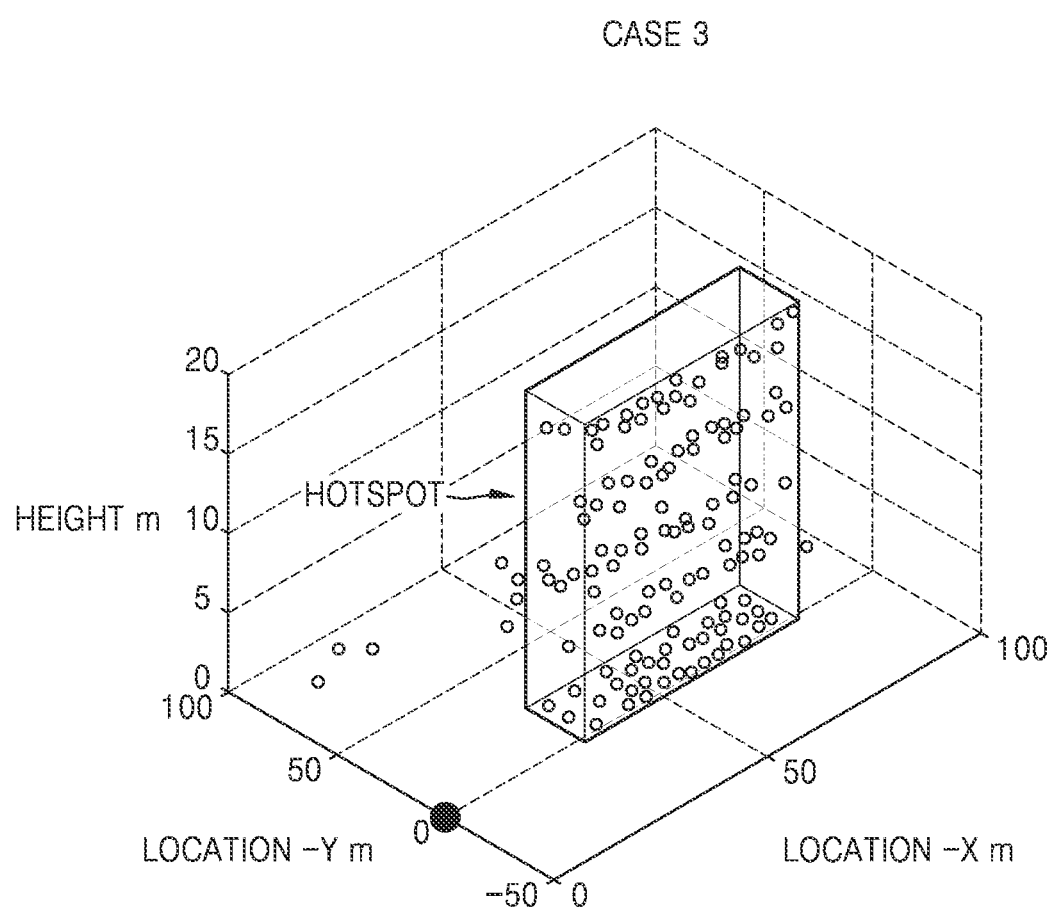

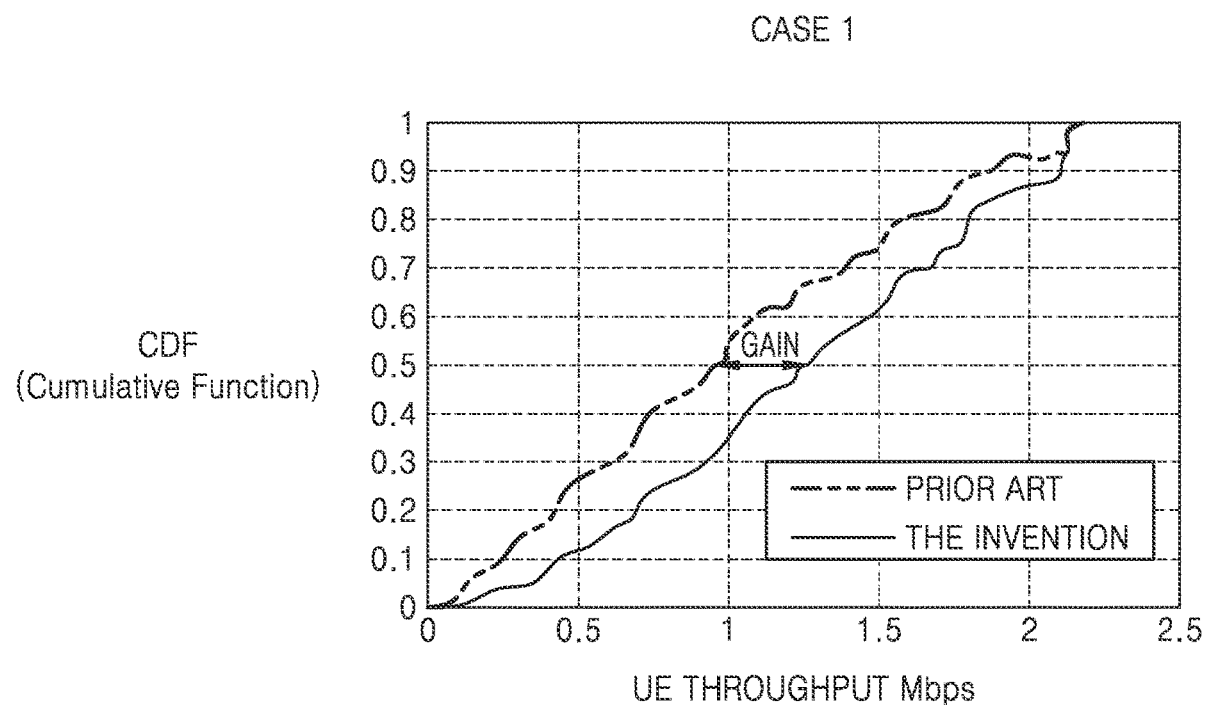

METHOD AND APPARATUS FOR CONTROLLING BEAM ADAPTIVELY IN WIRELESS COMMUNICATION SYSTEM

CROSS-REFERENCE TO RELATED APPLICATION

This application is based on and claims priority under 35 U.S.C. § 119 to Chinese Patent Application No. 201911370664.6, filed on Dec. 26, 2019, in the State Intellectual Property Office of P.R. China, the disclosures of which is incorporated by reference herein in its entirety.

BACKGROUND

1. Field

The disclosure relates to the field of communication technology, and particularly relates to a beam determination method, an apparatus, an electronic device, and a computer-readable storage medium.

2. Description of Related Art

To meet the increasing demand for wireless data traffic, due to the commercialization of 4th generation (4G) communication systems and increase of multimedia services, an improved 5th generation (5G) communication system or pre-5G communication system has been developed. The 5G communication system or the pre-5G communication system may also be referred to as a beyond 4G network communication system or post-long term evolution (LTE) system.

Implementation of 5G communication systems in an ultra-high frequency (millimeter wave (mmW)) band (such as a 60-GHz band) is under consideration to increase data transfer rates. To mitigate path loss and increase transmission distance during radio wave propagation in an ultra-high frequency band for 5G communication systems, various technologies such as beamforming, massive multiple-input multiple-output (MIMO), full dimensional MIMO (FD-MIMO), array antennas, analog beamforming, and large-scale antennas are being studied.

Furthermore, to improve system networks for 5G communication systems, various technologies including evolved small cells, advanced small cells, cloud radio access network (cloud-RAN), ultra-dense networks, device to device (D2D) communication, wireless backhaul, moving networks, cooperative communication, coordinated multi-points (CoMP), and interference cancellation are currently being developed. Furthermore, for 5G systems, advanced coding modulation (ACM) schemes such as Hybrid FSK and QAM modulation (FQAM) and SWSC (sliding window superposition coding) and advanced access techniques such as filter bank multi-carrier (FBMC), non-orthogonal multiple access (NOMA), sparse code multiple access (SDMA), etc. are being developed.

Moreover, the Internet has evolved from a human-centered connection network, in which humans create and consume information, to the internet of things (IoT) network in which dispersed components such as objects exchange information with one another to process the information. The internet of everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology and a security technology may be required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT can be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, technologies, such as sensor networks, M2M communication, MTC, etc., are implemented using techniques for 5G communication, including beamforming, MIMO, and array antennas.

SUMMARY

Provided are a beam controlling method, an apparatus, an electronic device, and a computer-readable storage medium.

Additional aspects will be set forth in part in the description that follows and, in part, will be apparent from the description, or may be learned by practice of the presented embodiments.

In accordance with an aspect of the disclosure, a method for controlling a beam in a cell, includes obtaining traffic distribution data of a plurality of beam areas included in the cell, obtaining a total number of a plurality of beams for a beam area among the plurality of the beam areas, based on the obtained traffic distribution data, and obtaining a beam width of one among the plurality of beams for the beam area, based on the obtained total number of the plurality of beams. The method further includes obtaining, from a candidate beam set, candidate beams for the beam area, based on the obtained total number of the plurality of beams and the obtained beam width of the one among the plurality of beams, and obtaining, from the obtained candidate beams, multiple beams for the beam area, based on a distance between the obtained candidate beams and the beam area.

The obtaining the beam width of the one among the plurality of beams may include obtaining, for the beam area, a number of beams arranged in a horizontal direction and a number of beams arranged in a vertical direction, based on the obtained total number of the plurality of beams for the beam area, a coverage range information of the beam area and a size of the one among the plurality of beams, and obtaining the beam width of the one among the plurality of beams, based on the coverage range information of the beam area and the obtained number of beams arranged in the horizontal direction for the beam area and the obtained number of beams arranged in the vertical direction for the beam area.

The obtaining the beam width of the one among the plurality of beams may further include obtaining a horizontal beam width by dividing a horizontal beam area width included in the coverage range information of the beam area by the obtained number of beams arranged in the horizontal direction for the beam area, and obtaining a vertical beam width by dividing a vertical beam area width included in the coverage range information of the beam area by the obtained number of beams arranged in the vertical direction for the beam area.

The obtaining the multiple beams for the beam area may include obtaining, from the obtained candidate beams, the multiple beams for the beam area, based on the distance between the obtained candidate beams and a center of the beam area.

The candidate beam set may include a plurality of candidate beam subsets having different beam widths, and the obtaining the candidate beams for the beam area may include obtaining, from the plurality of candidate beam subsets, a target beam subset for the beam area by selecting a candidate beam subset having a same beam width as the obtained beam width of the one among the plurality of beams, and obtaining, from the obtained target beam subset, the candidate beams for the beam area.

The obtaining the candidate beams for the beam area may include, based on the obtained total number of the plurality of beams for the beam area being less than one, combining the beam area with one or more neighboring beam areas to obtain a united beam area, and obtaining, from the candidate beam set, candidate beams for the obtained united beam area, based on a beam width of the obtained united beam area.

The obtaining the multiple beams for the beam area may include obtaining, from the obtained candidate beams, one beam for the obtained united beam area, based on the distance between the obtained candidate beams and a center of the obtained united beam area.

The obtaining the candidate beams for the obtained united beam area may include obtaining, as the candidate beams from the obtained united beam area, a candidate beam set having a same beam width with the beam width of the obtained united beam area.

The obtaining the traffic distribution data may include obtaining area-related information of the cell, and obtaining the traffic distribution data of the plurality of beam areas included in the cell, based on to the obtained area-related information of the cell.

The area-related information may include any one or any combination of environment data and location information of the cell.

The obtaining the traffic distribution data may further include predicting the traffic distribution data of the plurality of beam areas included in the cell, through a traffic prediction model based on the obtained area-related information of the cell.

The traffic prediction model may be trained by obtaining training samples including a sample of area-related information for a plurality of categories of cells, and a sample of traffic distribution data for each of the plurality of beam areas in the cell corresponding to the sample of area-related information for each of the plurality of categories, and training an initial prediction model, based on the sample of area-related information for the plurality of categories, until the predicted traffic distribution data for each of the plurality of categories that is output by the initial prediction model and the sample of traffic distribution data corresponding to a respective one of the plurality of categories satisfy preset condition, to obtain the traffic prediction model.

The obtaining the training samples may include obtaining initial sample data, wherein each piece of the initial sample data includes a type of initial area-related information of the cell and initial traffic distribution data of the cell under the initial area-related information, and the initial traffic distribution data of the cell includes the traffic distribution data of the plurality of beam areas included in the cell, obtaining a category of the initial traffic distribution data of the cell in each piece of the obtained initial sample data, to obtain classification results of the initial traffic distribution data, labeling the initial area-related information of the cell corresponding to the initial traffic distribution data with a corresponding category label, based on the obtained classification results of the initial traffic distribution data, to obtain the sample of areas-related information, and obtaining sample traffic distribution data corresponding to sample historic area-related information of the same category, based on the initial traffic distribution data belonging to the same category.

Based on the initial traffic distribution data of the cell including traffic distribution data corresponding to at least two traffic parameters, the determining the category of the initial traffic distribution data of the cell in each piece of the initial sample data may include obtaining a correlation between the traffic distribution data of the cell corresponding to a traffic parameter in two pieces of the initial sample data, respectively, for each of the at least two traffic parameters, with respect to any two pieces of the initial sample data, and identifying whether the initial traffic distribution data of the cell in the two pieces of the initial sample data is the same category, based on the obtained correlation corresponding to the traffic parameter in the two pieces of the initial sample data, respectively, for each of the at least two traffic parameters. The obtaining the sample traffic distribution data corresponding to the sample historic area-related information of the same category may include obtaining the sample traffic distribution data corresponding to the sample historic area-related information of the same category, based on the initial traffic distribution data of the cell in the two pieces of the initial sample data belonging to the same category.

The determining the total number of the plurality of beams for the beam area may include determining the total number of the plurality of beams for the beam area, based on the obtained traffic distribution data of the beam area, and a mapping relationship between a pre-configured traffic distribution data and a beam number, or determining the total number of the plurality of beams for the beam area, based on the obtained traffic distribution data of the beam area and any one or any combination of total traffic data distribution of all beam areas in the cell, a beambook size of the cell, a set value of a minimum beam number of the beam area, and a set value of a maximum beam number of the beam area.

In accordance with an aspect of the disclosure, an apparatus for controlling a beam in a cell, includes a memory storing one or more instructions, and at least one processor configured to execute the one or more instructions to obtain traffic distribution data of a plurality of beam areas included in the cell, obtain a total number of a plurality of beams for a beam area among the plurality of the beam areas, based on the obtained traffic distribution data, obtain a beam width of one among the plurality of beams for the beam area, based on the obtained total number of the plurality of beams, obtain, from a candidate beam set, candidate beams for the beam area, based on the obtained total number of the plurality of beams and the obtained beam width of the one among the plurality of beams, and obtain, from the obtained candidate beams, multiple beams for the beam area, based on a distance between the obtained candidate beams and the beam area.

The at least one processor may be further configured to obtain, for the beam area, a number of beams arranged in a horizontal direction and a number of beams arranged in a vertical direction, based on the obtained total number of the plurality of beams for the beam area, a coverage range information of the beam area and a size of the one among the plurality of beams, and obtain the beam width of the one among the plurality of beams, based on the coverage range information of the beam area and the obtained number of beams arranged in the horizontal direction for the beam area and the obtained number of beams arranged in the vertical direction for the beam area.

The at least one processor may be further configured to obtain a horizontal beam width by dividing a horizontal beam area width included in the coverage range information of the beam area by the obtained number of beams arranged in the horizontal direction for the beam area, and obtain a vertical beam width by dividing a vertical beam area width included in the coverage range information of the beam area by the obtained number of beams arranged in the vertical direction for the beam area.

The at least one processor may be further configured to obtain, from the obtained candidate beams, the multiple beams for the beam area, based on the distance between the obtained candidate beams and a center of the beam area.

In accordance with an aspect of the disclosure, a non-transitory recording medium having recorded thereon a program, which when executed by an apparatus for controlling a beam in a cell, causes the apparatus to obtain traffic distribution data of a plurality of beam areas included in the cell, obtain a total number of a plurality of beams for a beam area among the plurality of the beam areas, based on the obtained traffic distribution data, obtain a beam width of one among the plurality of beams for the beam area, based on the obtained total number of the plurality of beams, obtain, from a candidate beam set, candidate beams for the beam area, based on the obtained total number of the plurality of beams and the obtained beam width of the one among the plurality of beams, and obtain, from the obtained candidate beams, multiple beams for the beam area, based on a distance between the obtained candidate beams and the beam area.

In accordance with an aspect of the disclosure, a method for controlling a plurality of beams in a cell, includes predicting traffic of each of a plurality of beam areas included in the cell, obtaining a number of beams of each of the plurality of beam areas, based on the predicted traffic of each of the plurality of beam areas, obtaining a beam width of each of the plurality of beam areas, based on the obtained number of beams of each of the plurality of beam areas, and obtaining the plurality of beams respectively corresponding the plurality of beam areas, based on the obtained beam width of each of the plurality of beam areas.

The method may further include obtaining, from a candidate beam set, a plurality of candidate beams for the plurality of beam areas, based on the obtained number of each of the plurality of beam areas and the obtained beam width of each of the plurality of beam areas, and obtaining, from the obtained plurality of candidate beams, the plurality of beams respectively corresponding the plurality of beam areas, based on distances between the obtained plurality of candidate beams and the plurality of beam areas.

BRIEF DESCRIPTION OF THE DRAWINGS

The above and other aspects, features, and advantages of embodiments of the disclosure will be more apparent from the following description taken in conjunction with the accompanying drawings, in which:

FIGS. 15A, 15B and 15C illustrate diagrams of three different application scenarios in simulations of the disclosure, respectively;

FIGS. 16A, 16B and 16C illustrate graphs of user throughput cumulative distribution function of the three different application scenarios in the simulations of the disclosure, respectively, as shown in FIGS. 15A, 15B and 15C;

DETAILED DESCRIPTION

Figure 1:
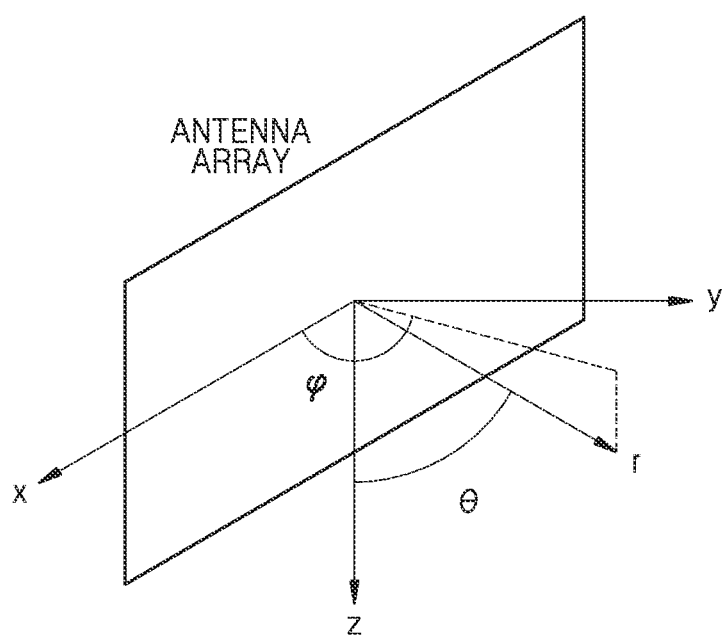
FIG. 1 illustrates a diagram of a beam radiation direction.

Various example of the disclosure will now be described in greater detail below with reference to the accompanying drawings. However, the disclosure may have different forms and may not be understood as being limited to embodiments set forth herein. Parts not related to the disclosure may be omitted for clarity. Throughout the drawings, it may be noted that like reference numbers are used to depict the same or similar elements, features, and structures.

The terms and words used in the following description and claims are not limited to the bibliographical meanings, but, are used to enable a clear and consistent understanding of the disclosure. Accordingly, it may be apparent to those skilled in the art that the following description of the embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a," "an" and "the" are intended to include the plural forms as well, unless the context clearly indicates otherwise. It may be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. Numerals are to be understood as examples for the sake of clarity, and are not to be construed as limiting the embodiments by the numbers set forth.

Herein, the terms, such as " . . . unit" or " . . . module" may be understood as a unit in which at least one function or operation is processed and may be embodied as hardware, software, or a combination of hardware and software.

It may be understood that, although the terms "first," "second," etc. may be used herein to describe various elements, and these elements may not be limited by these terms. These terms are used to distinguish one element from another. For example, a first element may be termed a second element within the technical scope of an embodiment of the disclosure.

Expressions, such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It may be noted that the functionality associated with any controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media in which data can be permanently stored and media in which data can be stored and later overwritten, such as a rewritable optical disc or an erasable memory device. Definitions for words and phrases are provided throughout this patent document, those of ordinary skill in the art may understand that in many, if not most instances, such definitions apply to prior, as well as future uses of such defined words and phrases.

Hereinafter, a base station (BS) is an entity that allocates resources to a UE (User Equipment), and may be any one or any combination of a gNode B, an eNode B, a Node B, a BS, a wireless access unit, a BS controller, or a network node. The term terminal may refer to a mobile phone, narrowband Internet of things (NB-IoT) devices, and sensors as well as other wireless communication devices. However, the BS and the terminal are not limited to the above examples.

Hereinafter, for convenience of description, the disclosure uses terms and names defined in the 3rd generation partnership project long term evolution (3GPP LTE) and/or 3GPP new radio (3GPP NR) specifications. However, the disclosure is not limited to the terms and names but may also be identically applied to systems that comply with other standards.

In a 5G system, especially A6G (above 6 GHz) frequency band, an analogue beam is used instead of digital beam for link transmission in a system due to cost and antenna array size limit, and beam feature may directly affect received signal quality, thereby the beam feature affects the coverage of the system and user performance. By designing Tx/Rx antenna phase shift for each antenna element, the system can use analogue beams with different beam widths, horizontal angles and vertical angles. Beams having different features are multiplexed using TDM (time-division multiplexing).

In the communication system, each of beams has a spatial feature among a set of spatial feature combination $\{\varphi, \theta, HPBW_h, HPBW_v\}$.

FIG. 1 illustrates a diagram of a beam radiation direction. Referring to FIG. 1, x, y and z are the three directions of the three-dimensional coordinate system, wherein, r represents beam radiation direction, $\varphi$ represents horizontal angle of beam maximum radiation direction, and $\theta$ represents vertical angle of beam maximum radiation direction. HPBW is half-power beam width, and also referred to as the 3 dB (decibel) beam width, which is the beam width between two points at which the power is reduced by half (3 dB) relative to the beam maximum radiation direction.

Figure 2:
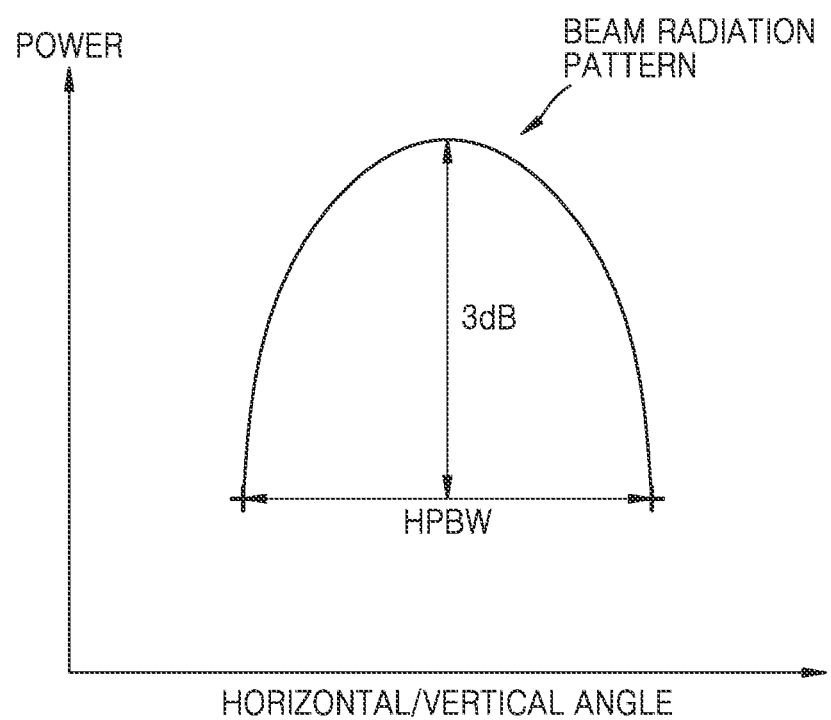
FIG. 2 illustrates a diagram of half power bandwidth (HPBW) of a beam.

FIG. 2 illustrates a diagram of HPBW of a beam. Referring to FIG. 2, HPBW includes $HPBW_h$ and $HPBW_v$, $HPBW_h$ represents horizontal half power beam width, and may be referred to as horizontal dimension width of beam, which is the key indicator reflecting beam width in horizontal direction, and $HPBW_v$ represents vertical half power beam width, and may be referred to as vertical dimension width of beam, which is the key indicator reflecting beam width in vertical direction. The parameter values $\{\varphi, \theta, HPBW_h, HPBW_v\}$ of the beam is decided by phase shifts on antenna elements.

Beam width refers to the coverage range of beam, which may also be referred to as the beam coverage range. Beam width may be indicated by two components, the beam width in horizontal direction (horizontal dimension) and the beam width in vertical direction (vertical dimension). The beam width in the horizontal dimension is the size of horizontal dimension coverage angle, i.e., $HPBW_h$ as described above, and the beam width in the vertical dimension is the size of vertical dimension coverage angle, i.e., HPBWv as described above. For example, if the horizontal dimension angle coverage range of one beam is 10°~20°, the beam width in the horizontal dimension of the beam is 10°.

A beam area, which is also referred to as a set area in the following description, is the area corresponding to the horizontal dimension angle coverage range and vertical dimension angle coverage range of the beam used by the UE according to the embodiments of the disclosure. One cell defined or configured by the base station may include one or more beam areas. The coverage ranges of different beam areas may be the same or different.

Figure 3:
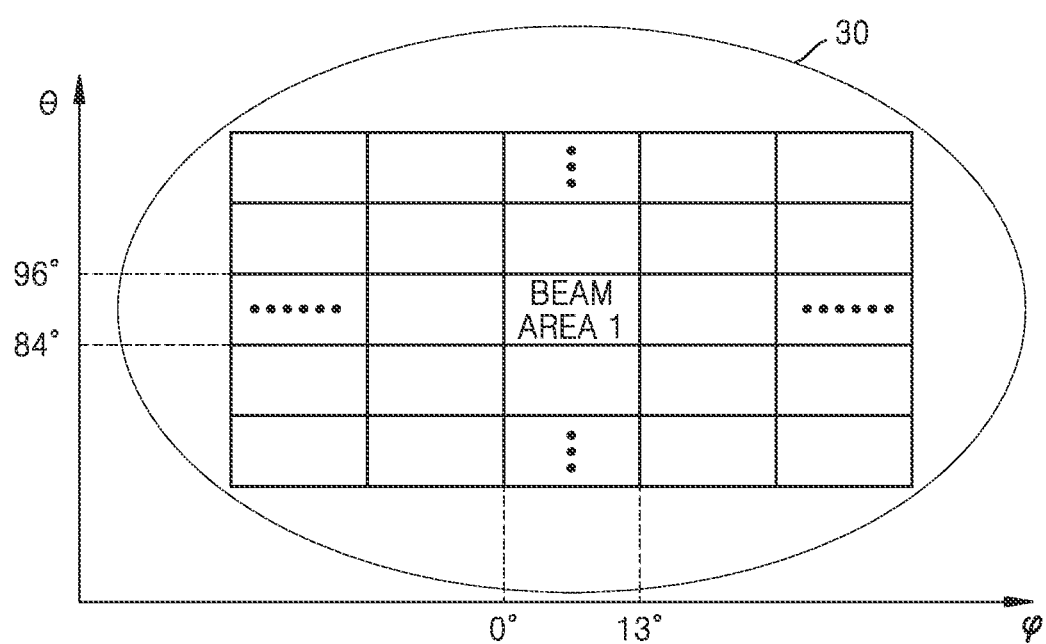
FIG. 3 illustrates a diagram of a beam area of a cell.

FIG. 3 illustrates a diagram of a beam area (a set area) of a cell. Referring to FIG. 3, one cell 30 may include a plurality of beam areas. The beam area is a minimum area that is controlled according to the embodiment of the disclosure. The beam area can be identified with a horizontal and a vertical angle range defined by beam. For example, referring to FIG. 3, a beam area 1 refers to an area in which the horizontal dimension coverage angle range of the cell is [0°, 13°] (the horizontal dimension width of the corresponding beam area is 13°−0°=13°) and the vertical dimension coverage angle range is [84°, 96°] (the vertical dimension width of the corresponding beam area is 96°−84°=12°). The beam area 1 is the coverage range of the beam with the serial number 1 used by the current measurement/report.

Coverage range information of the beam area, which may also be referred to as beam area information, refers to information that can determine the horizontal dimension coverage angle range and vertical dimension coverage angle range of the beam area. The beam area information may be explicit information, for example, may be a horizontal start angle, an end angle, a vertical start angle and an end angle of the beam area. For the beam area 1 as shown in FIG. 3, the beam area information includes the horizontal start angle is 0°, the horizontal end angle is 13°, the vertical start angle is 84°, and the vertical end angle is 96°. The beam area information may also be indicated implicitly. The beam area information may include a horizontal center point angle and a vertical center point angle of the beam area, and a size of horizontal coverage angle (i.e., horizontal dimension width) and a size of vertical coverage angle (i.e., vertical dimension width) instead of the horizontal start angle, the horizontal end angle, the vertical start angle and the vertical end angle of the beam area. For example, the beam area information for the beam area 1 may include the horizontal center point angle as 6.5°, the vertical center point angle as 90°, the size of the horizontal coverage angle as 13°, and the size of the vertical coverage angle as 12°.

A wireless communication system transmits data through a wireless beam. Beamforming is a signal processing technique used in antenna arrays for directional signal transmission or reception. A beamforming is achieved by a set of antenna arrays. Each antenna array consists of several antenna elements and each antenna array can be mapped with one RF Chain. Accordingly, the number of RF Chains or the number of arrays will determine the number of spatial layers that can be supported. Each array can generate an analog beam. The beam width of each beam may be designed to achieve a target narrow beam gain. The number of phase shifters and number of antenna elements will further determine the number of beam directions that can be generated. The number of beams direction along with the beamwidth will further determine the total coverage. Implementation can also consider different beambooks. Each beambook will map to different beam patterns. Beam patterns can be designed depending on deployment use cases associated with horizontal centric or vertical centric coverages. The set of all beams used by a base station for beam measurement and data transmission may be defined as a beambook. The number of beams in the beambook is beambook size. The beam book may include a relationship between a desired direction and phase shift value for the desired direction. The beambook management scheme in the conventional system is to use a fixed beambook for all base stations in the network use. In the prior art, within the beambook, the angle distribution of the beam may be uniform or approximately uniform. Furthermore, in a beam management scheme in the prior art, the beambook for the cell may be fixed, and the beambook may not change. The coverage angles of the beams in the beambook set are also uniformly or approximately uniformly distributed.

Figure 4A:
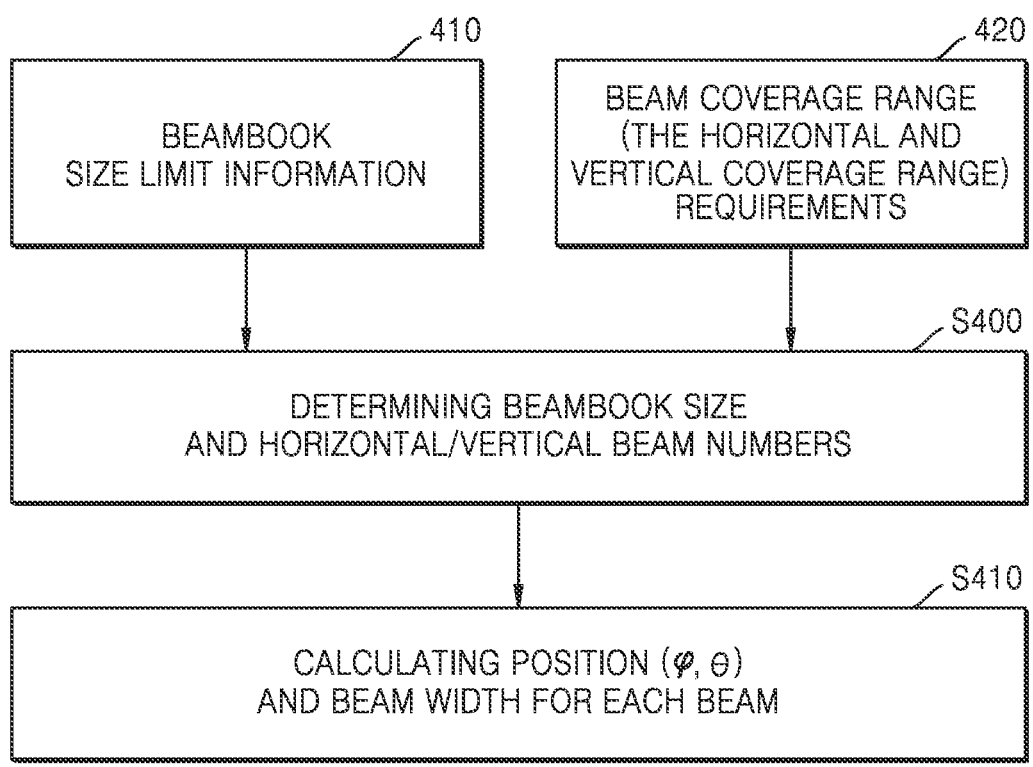
FIG. 4A illustrates a flowchart of a beam controlling method.

FIG. 4A illustrates a flowchart of a beam controlling method. Referring to the FIG. 4A, at operation S400, beambook size, horizontal beam number and vertical beam number of the cell are determined based on beambook size limit information 410 and beam coverage range requirement 420 of the cell. The numbers of beams arranged in horizontal direction and in vertical direction of antenna array are determined based on the beambook size limit information 410 and possible beam width supported by the antenna array of the base station. The beam coverage range requirement 420 includes the horizontal coverage range and vertical coverage range of the cell, such as the horizontal and vertical angle ranges shown in the FIG. 3. The beam coverage range requirements 420 may be determined according to the network coverage scenario of each operator. At operation S410, position (i.e., horizontal angle $\varphi$ and vertical angle $\theta$) and beam width for each of beams are calculated based on the principle that is to uniformly distribute the beams into the beam coverage range of the cell.

Figure 4B:
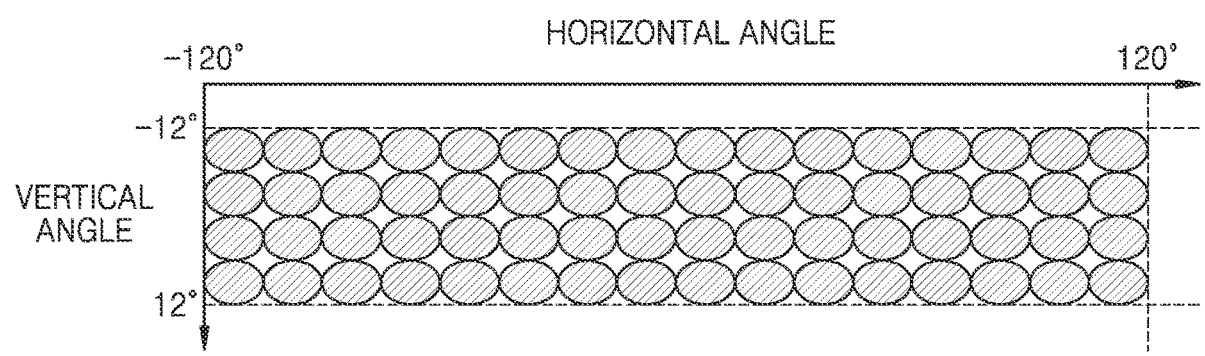
FIG. 4B illustrates a diagram of a beam distribution of a cell.

FIG. 4B illustrates a diagram of a beam distribution of a cell. Referring to FIG. 4B, the horizontal dimension coverage angle range corresponding to the beambook is [−120°, 120°], and the vertical dimension coverage angle range is [−12°, 12°]. Each of ellipses in FIG. 4B represents a beam, the size of the ellipse represents coverage range of the corresponding beam, and the coverage angle of each of beams in the beambook is uniformly distributed. As seen from FIG. 4B, the number of the beams arranged in the horizontal direction is 16 and the number of the beams arranged in the vertical direction is 4, and then the $HPBW_h$ of each of beams in the beambook is 240°/16, i.e., 15°, the $HPBW_v$ is 24°/4, i.e., 6°, the set of $\varphi$ of beams is {±7.5, ±22.5, . . . }, and the set of $\theta$ is {±3°, ±9°}.

According to the beam controlling method of FIG. 4A, the distribution of the beam in the cell is uniform, and the fixed beambook is used. However, a traffic distribution in the cell may not be uniform.

Figure 5:
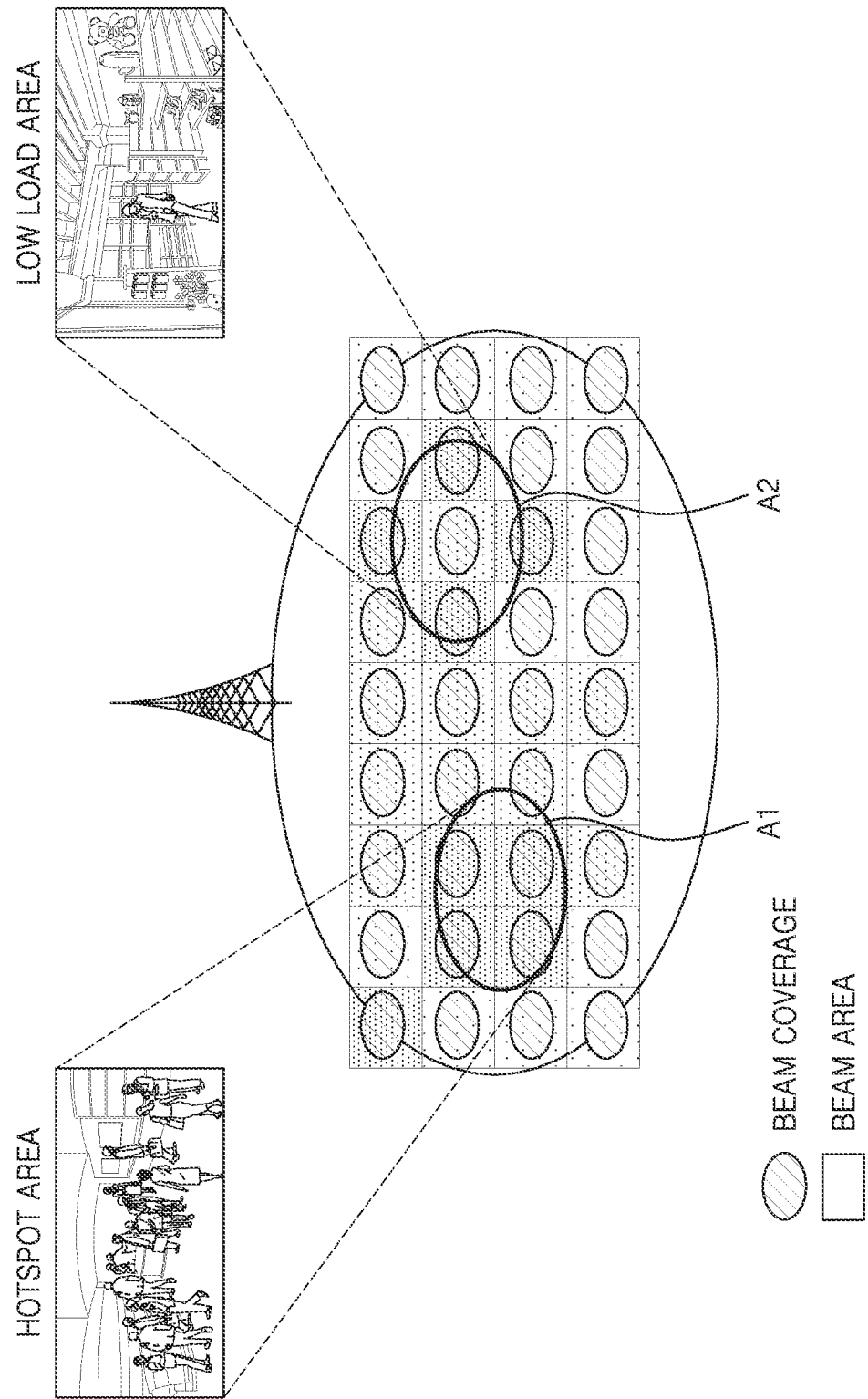
FIG. 5 illustrates a diagram of coverage effect.

FIG. 5 illustrates a diagram of coverage effect. Referring to FIG. 5, the largest ellipse area 50 represents the coverage range of the cell (i.e., the base station), and the beams in each beam area of the cell are uniformly distributed. The area A1 is a hotspot area, that is, a high load area, and the area A2 is low load area, but the beam densities of the hotspot area A1 and the low load area A2 are the same, which will result in poor coverage and poor user communication in the area A1, and the waste of beam resources in the area A2. In the area with low traffic density, that is, low load area, the beam utilization rate is low. In hotspot area with high traffic density, the density of existing beams (the number of beams in the beam area) cannot meet user needs. Therefore, information about the traffic distribution in the cell may be used to select beams for the cell flexibly according to the traffic distribution in the cell. Embodiments of the disclosure provide a beam controlling method, apparatus, electronic device, and computer-readable storage medium. According to the embodiment of the disclosure, traffic distribution in a cell is predicted by using historic data of the traffic distribution in the cell, beams for areas with different traffic densities to form a beambook of the cell are adaptively selected according to the predicted traffic distribution. According to the embodiment of the disclosure, it is possible to select more and narrower beams for hotspot areas, thereby using a denser and narrower beams to bring coverage gains to hotspot area, and select less and wider beams for low load areas to improve beam utilization efficiency and maintain coverage to ensure communication performance in low load areas.

Figure 6:
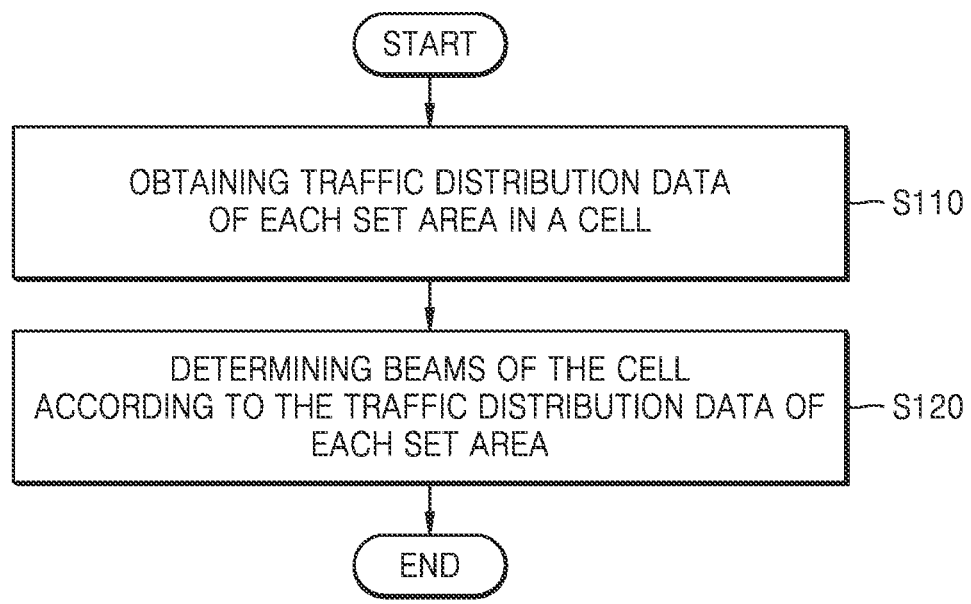
FIG. 6 illustrates a flowchart of a beam controlling method according to an embodiment.

FIG. 6 illustrates a flowchart of a beam controlling method according to an embodiment. Referring to FIG. 6, the beam controlling method may include the following operations:

Operation S110: obtaining traffic distribution data of each set area in a cell; and Operation S120: determining beams of the cell according to the traffic distribution data of each set area.

The traffic distribution data of a beam area (a set area) refers to data indicating traffic distribution situation of each of the beam areas included in the cell, and the data may refer to traffic volume or traffic density. In an embodiment, because the coverage area for different beam areas may be the same or different, to select beams for each beam area more optimally, the traffic distribution data may be the traffic density of the beam area, and the traffic density may be determined based on the traffic volume and the coverage area of the beam area.

When the traffic density is used as the traffic distribution data, the traffic density may be traffic volume in one unit area or relative traffic density. For example, for a beam area, the traffic density of the beam area may be obtained by dividing the traffic volume of the beam area by the coverage area of the area. Thus, the traffic density indicates traffic volume per unit area (traffic volume/unit area). The traffic density of the beam area may also be obtained by dividing the traffic volume of the beam area by a reference area. The reference area may be the coverage area of any beam area in the cell, or portion of any beam area. In this case, the traffic density indicates relative traffic density compared to the reference area.

In addition, one or more traffic parameters may be configured as the traffic distribution data. The traffic distribution data may be indicated by one traffic parameter, or indicated by a combination of the one or more traffic parameters. The traffic parameter may be any parameter reflecting communication quality or communication performance, and may include, but is not limited to, parameters such as throughput, number of connected UEs, and an amount of buffered data (such as an amount of buffered data to be transmitted) etc.

In an embodiment of the disclosure, because beams of a cell is flexibly determined according to the traffic distribution data of each beam area in the cell, it is possible to adapt to the traffic volume distribution of the cell well and make the beam density in the traffic hotspot area (i.e., the traffic high load area) higher, improve the coverage performance of hotspot areas, make the beam density in the traffic low load area lower, avoid the waste of beam resources under the premise of ensuring the communication performance in the low load area, realize the adaptive selection of beams based on the traffic distribution, and realize flexible management of beams.

In an embodiment of the disclosure, to more objectively evaluate whether a beam area is a high load area or a low load area, the traffic distribution data may be normalized such as the traffic density. In an embodiment of the disclosure, the traffic distribution data of each set area in the cell is obtained by using area-related information of the cell. The area-related information of the cell refers to related information of the region covered by the cell, and may refer to related information that can affect or may affect the traffic distribution situation of each beam area in the cell. The related information included in the area-related information may be configured or adjusted. The area-related information of the cell may include environment data and/or location information of the cell. The environment data may include, but is not limited to, time, date, weather, event, etc. The event refers to events that may affect the traffic, such as concerts, competitions, and so on. The granularity of the information such as time, date, and weather, etc. may be configured and adjusted. In an embodiment of the disclosure, the manner of determining the traffic distribution data of each beam area in the cell according to the area-related information of the cell is not limited in the embodiments of the disclosure. For example, statistical analysis may be performed on the historic area-related information of each cell and the historic traffic distribution data of each beam area in the corresponding cell. Then, a mapping relationship between the area-related information and the traffic distribution data is established based on the analysis results. When current traffic distribution data of each of beam areas in the cell is to be determined, the corresponding traffic distribution data may be found from the mapping relationship according to the current area-related information of the cell.

In another embodiment of the disclosure, to improve the objectivity of the prediction, an AI (Artificial Intelligence) algorithm with learning ability may be used to predict the traffic distribution data, that is, traffic prediction may be performed through a traffic prediction model. In another embodiment of the disclosure, the determining the traffic distribution data of each set area in the cell according to the area-related information of the cell may include predicting the traffic distribution data of each beam area through a traffic prediction model based on the area-related information of the cell. The traffic prediction model may be trained by obtaining training samples, where the training samples include sample area-related information for various categories of cells and sample traffic distribution data of each set area in the cell corresponding to the sample area-related information for each category, and by training an initial prediction model based on the sample area-related information for the various categories until the predicted traffic distribution data for each category output by the initial prediction model and the sample traffic distribution data corresponding to the category satisfy predetermined condition. After the training, the final prediction model is determined as the traffic prediction model. The sample area-related information for each category may include one or more types of area information that belong to the same category.

In another embodiment of the disclosure, the sample area-related information may be historic area-related information of the cell, which may include, but is not limited to, the location of the cell and/or historic environment data of the cell, etc. and the sample traffic distribution data may be historic traffic distribution data corresponding to the historic area-related information. To train the initial prediction model, the sample area-related information for each category may be labeled with a corresponding category label that represents the sample traffic distribution data of each beam area in the cell corresponding to the sample area-related information for the category. When training, the labeled sample area-related information is used as the input of the model, and the output of the model is the predicted traffic distribution data. Parameters of the model may be continuously updated and optimized according to the predicted traffic distribution data and the corresponding traffic distribution data in the samples, to obtain the final traffic prediction model. The model architecture on which the traffic prediction model is based is not limited in the embodiment of the disclosure, for example, an SVM (Support Vector Machine) model or other models may be used. The input of the model is the area-related information of the cell, and the output is the predicted traffic distribution data of each beam area in the cell.

According to embodiments, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing an AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

In another embodiment of the disclosure, the obtaining the training samples may include: obtaining each initial sample data, one piece of initial sample data including a type of initial area-related information of the cell and initial traffic distribution data of the cell under the initial area-related information, wherein the initial traffic distribution data of one cell includes the traffic distribution data of each beam area in the cell; determining the category of the initial traffic distribution data of the cell in each initial sample data, and obtaining classification results of the initial traffic distribution data; labeling the initial area-related information of the cell corresponding to the initial traffic distribution data with corresponding category label based on the classification results of the initial traffic distribution data, to obtain sample areas-related information; and obtaining sample traffic distribution data corresponding to sample historic area-related information of the same category based on the initial traffic distribution data belonging to the same category.

Each piece of initial sample data may be historic-related data of the cell, such as historic environment data of the cell, and historic traffic distribution data of each beam area in the corresponding cell, which are obtained by statistics. To better train the model, the initial area-related information and the corresponding initial traffic distribution data among the initial sample data may be classified first, and the model is trained based on the classified data.

When performing classification, a classification algorithm may be used to classify the obtained initial traffic distribution data (traffic distribution data of each beam area in the cell), and classify the initial area-related information corresponding to the initial traffic distribution data based on the classification result of the initial traffic distribution data. Because the initial traffic distribution data of each category after classification may include a plurality of initial traffic distribution data, and the plurality of initial traffic distribution data may correspond to a plurality of initial area-related information, therefore, the plurality of area-related information may correspond to the same classification label, and the sample traffic distribution data corresponding to the sample area-related information of each category may be obtained based on the initial traffic distribution data of the category. For example, the sample traffic distribution data corresponding to the category may be obtained through average, weighted average, or other data fusion methods of the initial traffic distribution data of the category, thereby establishing a correspondence relationship between the sample area-related information of each category and the corresponding sample traffic distribution data. The classification algorithm may be selected according to algorithms, such as the Pearson correlation coefficient algorithm (also known as the Pearson association classification algorithm).

As an example, assuming that the vector corresponding to the initial traffic distribution data of the cell included in one piece of initial sample data may be expressed as [1.5, 1.7, 2.9, 0, 33], and the vector corresponding to the initial traffic distribution data of the cell included in another piece of initial sample data may be expressed as [3, 3, 3, 3, 3], where the number of elements in the vector is the number of beam areas included in the cell, and the value of each of elements is the value used to represent the traffic distribution data of each beam area. When determining whether the two pieces of traffic distribution data in the cell belong to the same category, it can be determined based on the correlation between the two vectors, for example, whether the two pieces of traffic distribution data in the cell belong to the same category is determined by the Pearson association classification algorithm.

After the classification of the initial sample data is completed, the sample area-related information with category label, that is, classification label, may be used as the input of the model to train the model. The parameters of the model are updated based on the predicted traffic distribution data of the cell output by the model and the sample traffic distribution data of the corresponding category, and the model is used as the traffic prediction model when satisfying the conditions at the end of training.

In another embodiment of the disclosure, when the initial traffic distribution data of the cell includes traffic distribution data corresponding to at least two traffic parameters, the determining the category of the initial traffic distribution data in each initial sample data includes: determining correlation between the traffic distribution data of the cell corresponding to the traffic parameter in the two pieces of the initial sample data, respectively, for each traffic parameter, with respect to any two pieces of initial sample data; and determining whether the initial traffic distribution data of the cell in the two pieces of the initial sample data is the same category based on the correlation corresponding to traffic parameters in the two pieces of the initial sample data. Accordingly, the obtaining the sample traffic distribution data corresponding to the sample historic area-related information of the same category based on the initial traffic distribution data belonging to the same category includes: obtaining the sample traffic distribution data corresponding to the area-related information of the same category based on the initial traffic distribution data of the traffic parameters belonging to the same category.

It can be known from the foregoing description that the traffic distribution data of one cell may be traffic data capable of representing a plurality of traffic parameters, that is, for each type of initial area-related information, the initial traffic distribution data of the cell may include initial traffic distribution data of the plurality of traffic parameters. In an embodiment, to improve the objectivity of the model prediction, enable the traffic distribution data predicted by the model to more objectively reflect the actual traffic distribution situation of the cell, for the initial traffic distribution data of the cell under each type of the area-related information, the initial traffic distribution data corresponding to the plurality of different traffic parameters may be selected as basic data for training model. When classifying the initial traffic distribution data of the cell corresponding to each type of area-related information (the plurality of traffic distribution data corresponding to the plurality of traffic parameters), for the initial traffic distribution data of the cell corresponding to any two types of area-related information (which may be two types of area-related information of the same cell or two types of area-related information of different cells), whether the initial traffic distribution data of the cell corresponding to the two types of area-related information belong to the same category may be determined comprehensively based on the data correlation of the initial traffic distribution data of the cell corresponding to the traffic parameters under the two types of area-related information. For example, there are two types of traffic parameters, and for each type of area-related information, the initial traffic distribution data of the cell corresponding to the area-related information includes traffic distribution data corresponding to the two types of parameters. When determining whether two pieces of initial traffic distribution data of the cell are the same category, the correlation between the two pieces of distribution data under each type of traffic parameter may be calculated respectively, and then whether the two pieces of initial traffic distribution data of the cell is the same type may be obtained based on the correlation corresponding to the two types of traffic parameters.

In another embodiment, when determining whether the initial traffic distribution data of the cell in the two pieces of initial sample data are the same category based on the correlation corresponding to each traffic parameter, whether two initial traffic distribution data in the two pieces of initial sample data are the same category may be determined based on the correlation of the traffic distribution data of the cell corresponding to each traffic parameter of the cell in the two pieces of initial sample data and the weight corresponding to each traffic parameter.

Because different traffic parameters affect communication performance differently, the importance of each traffic parameter may be different. The correlation between the two pieces of traffic distribution data of the cells may be obtained by configuring a weight corresponding to each traffic parameter and performing weighted fusion on the correlation corresponding to each traffic parameter, such that whether the two pieces of traffic distribution data of the cell may be divided into the same category is determined, that is, whether the area-related information respectively corresponding to the two pieces of traffic distribution data of the cell belongs to the same category is determined.

The method for obtaining the sample traffic distribution data corresponding to the area-related information of the same category based on the initial traffic distribution data of each traffic parameter belonging to the same category is not limited in the embodiment of the disclosure. For example, the method may include averaging or performing weighted fusion on the initial traffic distribution data of each traffic parameter of the same category, etc.

After the traffic distribution data of each beam area in the cell is obtained, the beams of each beam area in the cell may be flexibly determined based on the traffic distribution data. When the traffic distribution data of a cell is represented by the plurality of traffic parameters, the traffic distribution data of each beam area in the cell corresponding to each type of traffic parameter may also be determined, and the beams of the beam area is determined based on the traffic distribution data of each set area corresponding to each traffic parameter. For example, new traffic distribution data capable of representing the traffic distribution data of each traffic parameter of the cell may be determined according to predetermined rules based on the determined traffic distribution data of the beam area corresponding to the traffic parameter. For example, the new traffic distribution data is obtained by averaging or weighted averaging the traffic distribution data of each traffic parameter, and the beams of the set area may be determined based on the new traffic distribution data.

Accordingly, when the traffic distribution data of each beam area of the cell is predicted by the traffic prediction model (that is, the corresponding traffic prediction model may be trained and obtained for each type of traffic parameter), for example, there are two types in the traffic parameter, the traffic prediction model corresponding to each traffic parameter or the parameters of the model corresponding to each type of traffic parameter is trained and obtained base on the training samples corresponding to each type of traffic parameter, or traffic distribution data of each set area corresponding to each type of traffic parameter is obtained based on the traffic prediction model or the parameters of the model corresponding to each traffic parameter.

In an embodiment of the disclosure, a beam controlling method according to an embodiment of the disclosure may include obtaining traffic distribution data of a plurality of beam areas included in the cell; determining a total number of beams for a beam area among the plurality of the beam areas based on the traffic distribution data; determining a beam width of a beam for the beam area based on the total number of beams; determining candidate beams for the beam area from a candidate beam set based on the total number of beams and the beam width of the beam; and determining beams for the beam area from the candidate beams based on a distance between the candidate beams and the beam area.

It can be known from the foregoing description that the beam width of each beam area include the beam width in the horizontal dimension (i.e., the horizontal dimension beam width) and the beam width in the vertical dimension (i.e., the vertical dimension beam width) of the set area.

Because the arrangement direction of the beam includes vertical arrangement and horizontal arrangement, after determining the total number of beams for each beam area, the number of the beams arranged in the horizontal direction and the number of the beams arranged in the vertical direction for the set area may be determined according to the ratio (may also be simply referred to as vertical and horizontal beam number ratio) information of the beams arranged in the horizontal direction to the beams arranged in the vertical direction, so that the beam width of the set area is further determined according to the individual beam area information of the beam area, that is, the width of the beam in horizontal dimension of the beam area is determined according to the angle coverage range in the horizontal dimension and the number of the beams arranged in the horizontal direction for the beam area, and the width of the beam in the vertical dimension of the area is determined according to the angle coverage range in the vertical dimension and the number of beams arranged in the vertical direction for each beam area. After determining the beam width of each beam area, the beams of each beam area may be determined from the candidate beams to obtain the beambook of the cell.

It may be noted that the ratio information of the beams arranged in the horizontal direction and the beams arranged in the vertical direction may be directly the vertical and horizontal beam number ratio, or other information capable of determining the ratio, such as information capable of representing the horizontal beam number and the vertical beam number of the beam area.

In an embodiment of the disclosure, for the beam area, the determining the beams of the beam area from candidate beam set based on the beam width of the beam area includes: determining candidate beams of the beam area from the candidate beam set based on the beam width of the set area; and determining the beams of the beam area from the candidate beams of the beam area based on the distance between the candidate beams and the beam area.

The candidate beam set refers to all beams in the system, and the beams included in the beambook of each cell are the beams in the set. For one cell, after determining the beam width of each beam area in this cell, all beams of each beam area may be selected from all candidate beams in the system to generate the beambook of the cell according to the beam width. For a beam area, all beams for this beam area may be filtered out according to the beam width of the beams for the beam area and the beam width of the beams in the candidate beam set.

In an embodiment of the disclosure, for each beam area, when determining the beams of the beam area, some candidate beams may be filtered out from the candidate beam set based on the beam widths of the beams, and then the beams of the beam area is filtered out based on the distance of the candidate beams and the beam area.

The distance from a beam to a beam area may refer to a distance from a center of the beam to a center of the beam area. The distance from a first beam to a second beam may refer to a distance from a center of the first beam to a center of the second beam. The distance from one beam to another beam may be determined based on direction vector of center location of the beam and center point vector of the beam area.

In an embodiment of the disclosure, the candidate beam set includes candidate beam subsets divided according to the beam widths. For a beam area, the determining the candidate beams of the beam area from the candidate beam set based on the beam width of the beam area may include: determining the target beam subset corresponding to the beam area from the candidate beam subsets based on the beam width of the beam area and the beam width corresponding to each candidate beam subset, and determining beams in the target beam subset as the candidate beams for the beam area.

The candidate beam set of the system may include a plurality of beam subsets, and the beam subsets may be divided according to the beam widths, that is, the system supports the plurality of candidate beam subsets with different beam widths. Based on the beam width of each of beam areas, one or more target candidate beam subsets for each set areas may be firstly determined according to the beam width of each beam area from candidate beam subsets; and then final beams of each beam area are determined from the determined target candidate beam subsets. For a beam area, for example, the candidate beam subset that has the beam width closest to that of the beam area may be used as the target beam candidate subset for the beam area.

For each of candidate beam subsets, the beam width of the beam subset refers to a width used to represent the beam width of beams included in the subset, and the representing of the beam width of the candidate beam subset is not limited in the embodiment of the disclosure. For example, when dividing the beams into different beam subsets, the beam width corresponding to each of subset may be configured, and each of the beams is assigned to a subset of the corresponding width according to the beam widths of the beams and the beam width of the subsets. The beam width of each of the subsets may be a pre-configured beam width, or the beam width of the subset may be determined according to the beam widths of all beams included in the subset. For example, the average value of the beam widths of all beams included in the subset is determined as the beam width of the beam subset.

In an embodiment of the disclosure, for a beam area, the determining the beams of the beam area from candidate beam set based on the beam width of the beam area includes: using the beam area and neighboring beam area of the beam area as a united area in case that the total number of beams for the beam area is less than a first threshold value, and determining each beam for the united area from the candidate beam set based on the beam width of the united area. The first threshold value may be configured, for example, it may be set to 1.

To better improve the utilization rate of the beam, when the number of beams for the beam area is less than the first threshold value, a plurality of neighboring beam areas may be combined and processed as an united area. The beam width of the united area is determined based on the beam width of each beam area included in the united area. For example, the width of the beam selected for the united area may be the largest beam width among the beam widths of the beam areas included in the united area to ensure the coverage effect of each beam area, or may be the beam widths selected for the beam areas included in the united area, that is, the beam width of the united area includes a plurality of beam widths.

It can be understood that when the candidate beam set includes a plurality of candidate beam subsets, target candidate beam subset corresponding to the united area may be determined from the candidate beam subsets according to the beam width of the united area, and then the beams of the united area are determined from the subset based on the distance between each of the beams in the target candidate beam subset and the united area. For a beam area in which the total number of beams is less than the first threshold value, the neighboring beam area of the beam area may be any one or more beam areas neighboring to the beam area, or may be neighboring beam area determined according to a rule, for example, may be neighboring beam area in which the total number of beams is also less than the first threshold value.

In addition, in the embodiment of the disclosure, two neighboring beam areas may refer to the area coverage ranges (which may be in horizontal and/or vertical) of the two neighboring beam areas, or may refer to distance between the two neighboring beam areas (such as the distance between the center point vectors of the two beam areas) satisfies a preset condition, for example, less than a set distance. In addition, which beam areas belong to the neighboring beam area may be determined according to a preconfigured rule.

In an embodiment of the disclosure, the determining the beams of the united area from the candidate beam set based on the beam width of the united area includes: determining the beam width of the united area based on the beam width of each beam area included in the united area; determining candidate beams of the united area from the candidate beam set based on the beam width of the united area; and determining the beams of the united area from the candidate beams based on the distance between the beams and each beam area included in the united area.

The beam width of the united area may be determined based on the beam widths of the beam areas included in the united area. The beam width of the united area may be the largest beam width among the beam widths of the beam areas included in the united area, or may also be the beam widths of the beam areas included in the united area. When determining the beam widths of the beam areas included in the united area as the beam width of the united area, the determining the candidate beams of the united area from the candidate beam set includes determining the candidate beams from the candidate beam set based on the beam widths of the beam areas included in the united area. For example, if the united area includes two beam areas, in which the beam width selected for a beam area is width A and the beam width of the other beam area is width B, the beam width of the united area may be the larger one between width A and width B, or may include width A and width B.

The candidate beams of the united area can be determined similarly to the process of determining the beams of the beam area. First, the candidate beams of the united area are determined, and final beams are selected from the candidate beams based on the distance. The distance from one beam to one united area may be determined based on the distance from the beam to each beam area included in the united area. For example, the distance may be sum of the distances from the beam to the beam areas included in the united area, that is, a sum distance, may be the maximum value or the minimum value among the distances from the beam to the set areas included in the united area, or may be an average value, and the like. Similarly, when the candidate beam set includes a plurality of subsets, the candidate beams of the united area may be beams in the target candidate beam subset determined according to the beam width of the united area.

In an embodiment of the disclosure, the united area may satisfy any one or any combination of the following conditions: i) the total number of beams for each beam area included in the united area is the same, ii) the beam width for each beam area included in the united area is the same, iii) the total number of beams for each beam area included in the united area is less than a first threshold value, and iv) the sum of the total numbers of beams for all the beam areas included in the united area is less than a second threshold value.

That is, the beam areas included in the united area may be determined according to any one or any combination of the beam width and the total number of beams for each beam area. When the beam width of each beam area included in the united area is the same, the beam width of the united area may be directly determined as the beam width of the beam areas included in the united area. It can be understood that the second threshold value is not less than the first threshold value, and the second threshold value may be equal to the first threshold value.

In an embodiment of the disclosure, for a beam area, the determining the total number of beams for the beam area according to the traffic distribution data of the beam area including any one or any combination of the following: determining the total number of beams for the beam area according to the traffic distribution data of the beam area, and the mapping relationship between the pre-configured traffic distribution data and the beam number; and determining the total number of beams for the beam area according to the traffic distribution data of the beam area and any one or any combination of the following information: total traffic data distribution of all beam areas in the cell, beambook size of the cell, set value of the minimum beam number of the beam area, and set value of the maximum beam number of the beam area.

The total number of beams for each beam area may be determined through a pre-configured traffic volume mapping relationship. Different traffic distribution data may be mapped to one beam number, and after determining the traffic distribution data of each beam area, the corresponding beam number may be found through the mapping relationship. The beam number refers to the total number of beams for the beam area.

In addition, due to limited resources of the system, the size of the beambook in each cell is limited, and the usable beam number of each beam area may be limited, i.e., the above set value of the maximum beam number. To ensure the coverage effect of each beam area, each beam area may also be set with a limit of the minimum beam number, i.e., the above set value of the minimum beam number. Therefore, when determining the total number of beams for each beam area in a cell, in addition to the traffic distribution data of the set area, factors such as the total traffic data distribution of all the beam areas in the cell to which the set area belongs, the size of the beambook, the set value of the minimum beam number of the set area, and the set value of the maximum beam number of the set area may be considered, to reasonably determine all beams in the beam area as much as possible according to the traffic distribution data of each beam area on the premise that some limitations specified by the system are satisfied.

In an embodiment of the disclosure, the ratio of the beams arranged in the horizontal direction and the beams arranged in the vertical direction for each beam area is pre-configured, or, it is determined by any way of the following: determining the ratio of the beams arranged in the horizontal direction and the beams arranged in the vertical direction for each beam area according to the individual coverage range information of each beam area, and determining the ratio of the beams arranged in the horizontal direction and the beams arranged in the vertical direction for each beam area according to the coverage range information of all the beam areas in the cell.

The ratio of the vertical beam number and the horizontal beam number may be configured by the system or may be determined based on other configuration information. The other configuration information may be information that reflects the widths or the width ratio of the vertical and horizontal beams, such as the widths of the vertical and horizontal beams that the antenna system may support, or may be information that reflects the numbers or the vertical and horizontal beam number ratio in the beam area, such as the coverage area information of the beam area. The vertical and horizontal beam number ratio of each beam area may be determined according to actual factors. In addition, the vertical and horizontal beam number ratio of for each of the beam areas may be set equally or differently.

According to the embodiments of the disclosure, the beams may be adaptively selected for the beam areas according to the traffic densities, and flexible determination of the beambook of a cell may be achieved. According to the traffic distribution data of each beam area, it is possible to select more and narrower beams for hotspot areas thereby improving coverage gains of hotspot areas, and select less and wider beams for low load areas thereby improving beam utilization efficiency and ensuring the coverage of low load areas.

Figure 7:
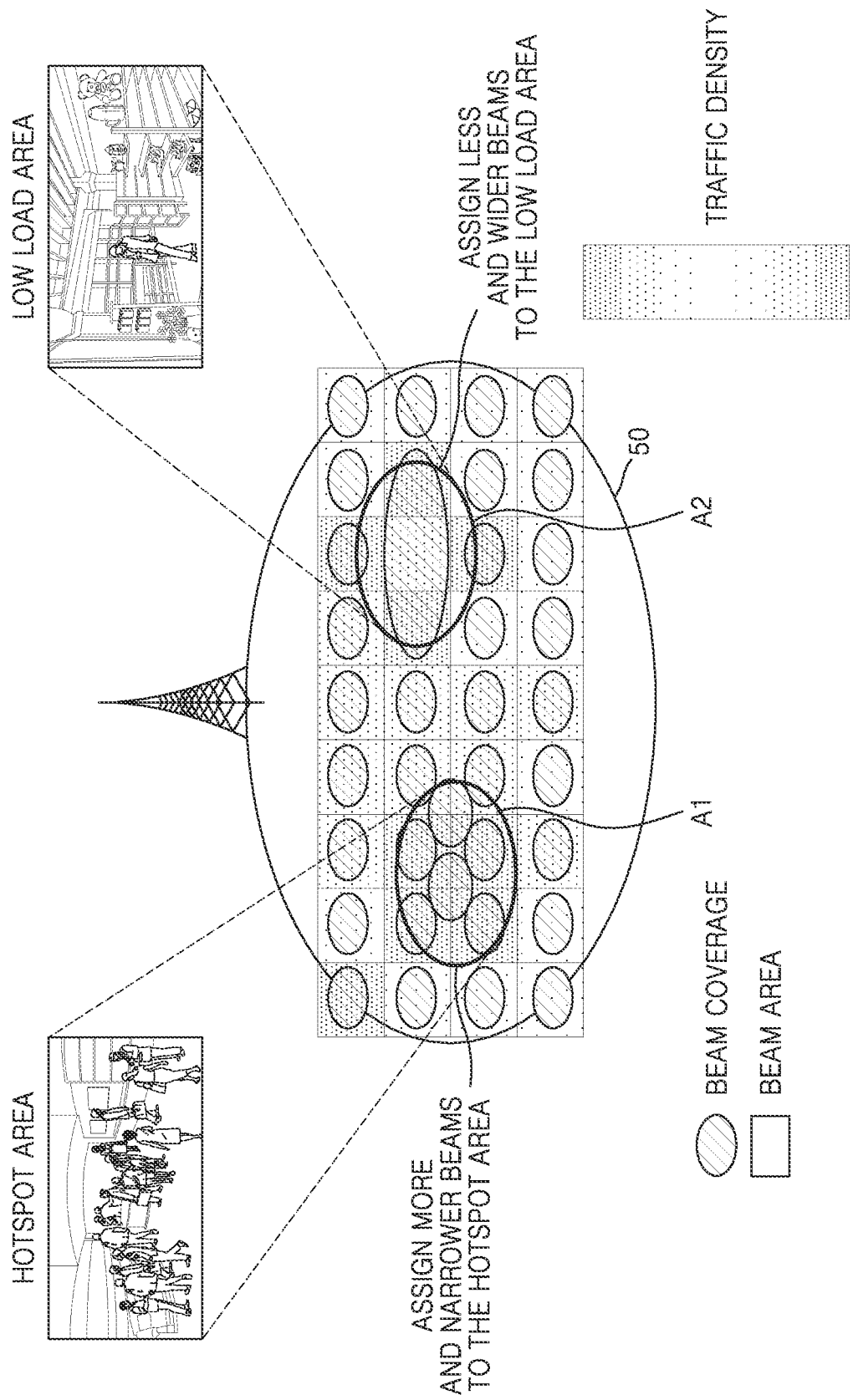
FIG. 7 illustrates a diagram of beam coverage effect according to an embodiment.

FIG. 7 illustrates a diagram of beam coverage effect according to an embodiment. Referring to FIG. 7, among the beam areas (i.e., the set areas) in the coverage range of the cell 50, it is assumed that beam areas A1 belong to hotspot area and high load area, and beam areas A2 belong to low load area. According to the embodiment of the disclosure, the number of beams in each beam area in the cell may be determined based on the traffic distribution data of each beam area. As shown in the FIG. 7, more and narrower beams may be assigned to each of the beam areas A1 included in the hotspot area, so that the beam areas A1 may obtain better coverage performance, and less and wider beams may be assigned to the beam areas A2 in the low load area thereby improving beam utilization and ensuring the coverage of the low load area.

The disclosure will be further described below with reference to an embodiment. It may be noted that the implementation described in the embodiment is only an implementation of the disclosure. In the embodiment, the beam area of the cell may be called as the set area.

Figure 8A:
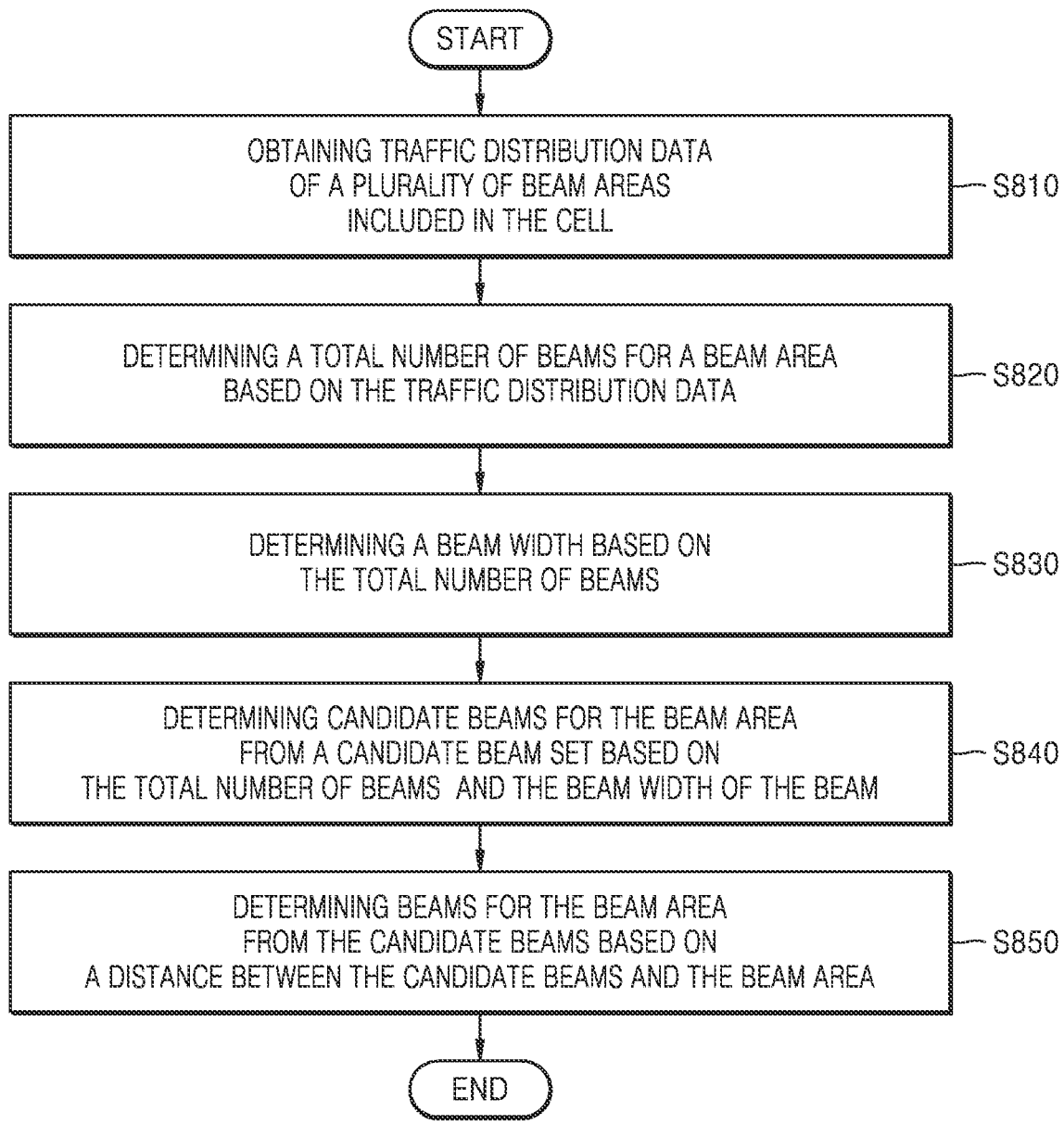
FIG. 8A illustrates a flowchart of a beam controlling method according to another embodiment.

FIG. 8A illustrates a flowchart of a beam controlling method according to another embodiment. Referring to FIG. 8A, at operation S810, traffic distribution data of a plurality of beam areas included in the cell is obtained. At operation S820, a total number of beams for a beam area among the plurality of the beam areas is determined based on the traffic distribution data. At operation S830, a beam width of a beam for the beam area is determined based on the total number of beams. At operation S840, candidate beams for the beam area from a candidate beam set are determined based on the total number of beams and the beam width of the beam. At operation S850, beams for the beam area are determined from the candidate beams based on a distance between the candidate beams and the beam area.

Figure 8B:
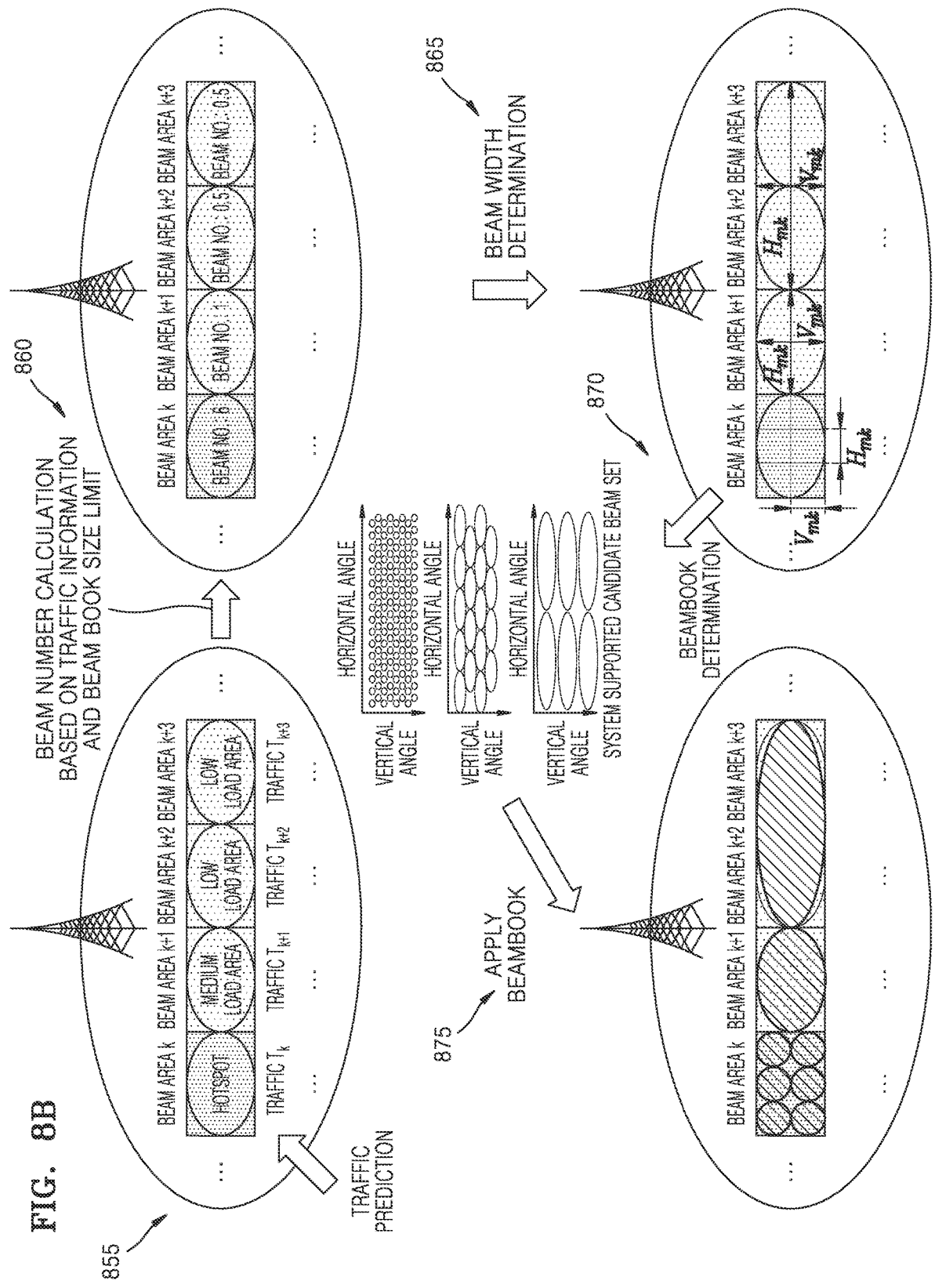
FIG. 8B illustrates a diagram of a beam controlling method according to an embodiment.

FIG. 8B illustrates a diagram of a beam controlling method according to an embodiment. Referring to FIG. 8B, firstly, in operation 855, traffic prediction is performed for the beam areas included in the cell. An operation of predicting traffic distribution of the cell may be performed by using AI (that is, a traffic prediction model) based on historic environment data and a historic traffic distribution classification label. A traffic prediction model is trained based on the historic environment data and the corresponding traffic distribution data to predict the traffic distribution data of the cell through the model. For example, an SVM model may be used as the traffic prediction model. Category to which the traffic distribution data of each beam area in the cell belongs may be predicted through the classification model, and the traffic distribution data of the category is the traffic distribution data for the beam area. The traffic prediction model may also be a model that directly outputs the traffic distribution data of each beam area. In this example, it is explained through an example in which the traffic prediction model is a classification model and the output of the model is category of traffic distribution data of each beam area.

To train the classification model, training samples may be obtained first. In the embodiment, the training samples may be obtained through historic environment data (initial area-related information) and corresponding historic traffic distribution data (that is, initial traffic distribution data) of the cell.

The historic environment data may include, but is not limited to, time, date, weather, events, etc. The historic traffic distribution data information includes the traffic volume information of each beam area of the cell under the historic environment data. The traffic volume information may be implemented by the parameters (i.e., the traffic parameters) such as the average throughput in the beam area, the number of users accessing or transmitting traffics, and the amount of buffered data (the amount of data to be transmitted), and the traffic volume information may be one of the parameters or a combination of the plurality of parameters.

A classification algorithm may be used to classify historic traffic distribution data, and label the corresponding historic environment data thereof. For example, the Pearson correlation algorithm may be used to obtain classification of historic traffic distribution data through correlation operation between historic traffic distribution data vectors of the cell measured at different times; classify and label the corresponding historic environment data based on the classification result of the historic traffic distribution data; and train the classification model by using the classification-labeled historic environment data as reference samples, that is, training samples. After the trained classification model is obtained, based on the trained model, traffic distribution data of all beam areas in the cell at a future time point or future period may be predicted by using environment data at the future time point or the future period as the input.

Figure 9:
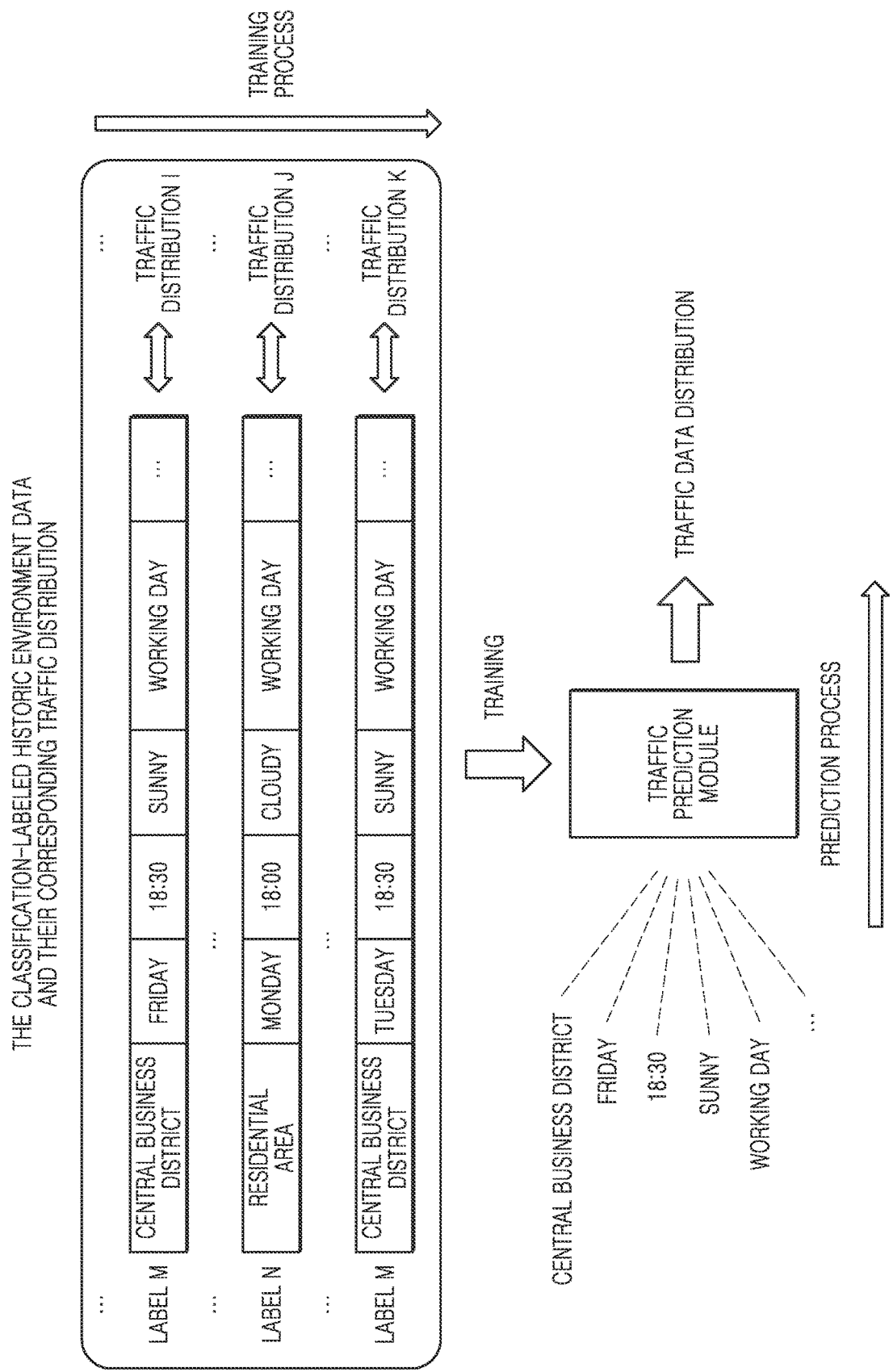
FIG. 9 illustrates a diagram of a method for predicting traffic distribution data according to an embodiment.

FIG. 9 illustrates a diagram of a method for predicting traffic distribution data according to an embodiment. Referring to FIG. 9, several types of historic environment data as shown are: {Central Business District, Friday, 18:30, Sunny, Working Day, . . . }, {Residential Area, Monday, 18:00, Cloudy, Working Day, . . . }, {Central Business District, Tuesday, 18:30, Sunny, Working day, . . . }, each type of the historic environment data corresponds to the historic traffic distribution data of each beam area in the cell under the environment data, such as the traffic distribution data corresponding to the environment data {Central Business District, Friday, 18:30, Sunny, Working Day, . . . } is traffic distribution i; the historic traffic distribution data is classified by the classification algorithm, and the corresponding historic environment data is labeled, as shown, the traffic distribution i and traffic distribution k are classified into the same category by the classification algorithm, therefore, traffic distribution i and traffic distribution k and their corresponding historic environment data belong to the same label m, and the historic environment data corresponding to traffic distribution j belongs to label n, and the sample traffic distribution data of the category corresponding to the type of the environment data may be determined based on the traffic distribution data corresponding to each classification label.

After the classification of the data is completed, the classification model (the traffic prediction module of FIG. 9) may be trained based on the classified data. During training, the input of the model is historic environment data of each category, and the output is the category of the traffic distribution predicted by the model. Whether the training of the model is completed may be judged based on the difference between the traffic distribution data predicted by the model and the sample traffic distribution data, for example, it may be judged by loss function corresponding to the model. The value of the loss function represents the difference between the traffic distribution data predicted by the model and the corresponding sample traffic distribution data.

After obtaining the trained classification model, the environment data of the cell at a time point such as {Central Business District, Friday, 18:30, Sunny, Working Day} is input to the trained classification model, and the traffic data distribution of each beam area corresponding to the inputted environment data of the cell is predicted by the model.

The training process of the model is described with reference to a case. In the case, it is assumed that each initial sample data includes a type of historic environment data $\alpha$ (initial environment data) of a cell and historic traffic distribution data $\beta$ (initial traffic distribution data) of the cell under the historic environmental data. During training, each traffic distribution data may be represented by a vector of the traffic distribution data. It can be known from the foregoing description that the historic environment data $\alpha$ may include various environment information that affects the traffic distribution of the cell. The historic environment data may be represented by setting different parameters, such as time parameters (such as 1 for daytime and 0 for night), date parameters (such as 1-7 for Monday to Sunday), weather parameters (such as 1 for sunny, 2 for rainy, 3 for cloudy, and 4 for snowy), holiday parameters (such as 1 for yes, 2 for no), and other possible parameters (for example, the emergency event tags such as concerts, football matches etc.). The historic environment data may be one of the parameters or a combination of more parameters. A type of parameters may be further refined, for example, for the rainy, rainfall parameter etc. may be added.

The historic traffic distribution data $\beta$ includes a vector that may represent the traffic distribution situation of each beam area in the cell. It may be represented by traffic parameters such as throughput, the number of connected UEs, and the amount of buffered data etc. Assuming that the cell supports N beam areas, the beam traffic distribution data of the cell may be represented by T={$T_1$, $T_2$, . . . , $T_k$, . . . , $T_N$}, where $T_k(t)$ represents the traffic distribution data of the $k^{th}$ (1≤k≤N) beam area at time t. Assuming that $S_k(t)$ represents the area covered by the $k^{th}$ beam area at time t, and $S'_k$ is the area covered by a reference beam area (also known as the base beam area), that is, the area of reference area, which is a constant. Taking the throughput of the system as an example, the normalized traffic distribution data of the $k^{th}$ beam area at time t may be expressed by the following Equation 1 or Equation 2:

$$T'_k(t) = \left[\frac{S_k(t)}{S'_k}\right]^{-1} \cdot T_k(t) \quad (1)$$

$$T'_k(t) = \frac{T_k(t)}{S_k(t)} \quad (2)$$

In equations 1 and 2, sequence {$T'_1(t)$, $T'_2(t)$, $T'_3(t)$, . . . , $T'_k(t)$, . . . , $T'_N(t)$} represents traffic distribution information of all the beam areas. It can be understood that when the traffic distribution data is represented by a plurality of traffic parameters, $T'_k(t)$ represents the traffic distribution data represented by each traffic parameter of the $k^{th}$ beam area at time t.

After the above-mentioned preprocessing of the traffic distribution data, a multi-dimensional traffic information classification algorithm (for example, based on the Pearson association classification algorithm) may be used to classify the historic traffic distribution data. The classification equation based on the Pearson association classification algorithm may be expressed by the following Equation 3:

$$\rho = \Sigma_{i=1}^{BT} \omega_i * PCC_i \quad (3)$$

In equation 3, $\rho$ represents correlation between two vectorized historic traffic distribution data of the cell (the historic traffic distribution data of all beam areas in the cell, when the plurality of traffic parameters are used, it is the historic traffic distribution data of all beam areas in the cell corresponding to each traffic parameter). BT represents the number of the types used as the traffic parameters. For example, if the traffic parameters include throughput, the number of connected UEs, and the buffered traffic, the value of BT is 3. $\omega_i$ represents different weight of $i^{th}$ type of traffic parameter, and the weights of the above three traffic parameters may be 0.3, 0.5, and 0.2, and $\Sigma_{i=1}^{BT} \omega_i = 1$. $PCC_i$ represents correlation factor (correlation) between the two vectorized historic traffic distribution data of the cell (the historic traffic distribution data of all beam areas in the cell) corresponding to the $i^{th}$ type of traffic parameter, and the equation of $PCC_i$ may be expressed by the following Equation 4:

$$PCC_i = \frac{\left[N * \sum_{j=1}^{N} \beta_{R,i,j} * \beta_{E,i,j} - \sum_{j=1}^{N} \beta_{R,i,j} \sum_{j=1}^{N} \beta_{E,i,j}\right]}{\left[\sqrt{N * \sum_{j=1}^{N} \beta_{R,i,j}^2 - \left(\sum_{j=1}^{N} \beta_{R,i,j}\right)^2}\right]} \quad (4)$$

In equation 4, N represents the number of beam areas included in the cell, $\beta_{R,i,j}$, $\beta_{E,i,j}$ respectively represents two historical traffic distribution data corresponding to the $i^{th}$ traffic parameter of the $j^{th}$ beam area in the two cells R and E. R and E may be the same cell or different cells.

Using the above Equation 4, the correlation between the traffic distribution data of the two cells corresponding to each traffic parameter may be calculated. Then based on the Equation 3, the correlation between the two historic traffic distribution data may be calculated, where if |ρ| is greater than a set threshold, such as greater than 0.5, it means that the two historical traffic distribution data corresponding to R and E belong to the same category.

As an example, for two cells A and B, assuming that cell A includes 5 beam areas, and cell B also includes 5 beam areas. At a time, for traffic parameter 1, it is assumed that the normalized traffic distribution data of the 5 beam areas in the cell A are $a_{11}$, $a_{12}$, $a_{13}$, $a_{14}$, $a_{15}$, respectively, and the normalized traffic distribution data of the 5 beam areas in the cell B are $b_{11}$, $b_{12}$, $b_{13}$, $b_{14}$, $b_{15}$, respectively. For traffic parameter 2, it is assumed that the normalized traffic distribution data of the 5 beam areas in the cell A are $a_{21}$, $a_{22}$, $a_{23}$, $a_{24}$, $a_{25}$, respectively, and the normalized traffic distribution data of the 5 beam areas in the cell B are $b_{21}$, $b_{22}$, $b_{23}$, $b_{24}$, $b_{25}$, respectively. When determining whether the traffic distribution data of the cells A and B belong to the same category at a time, the correlation between the traffic distribution data of the two cells corresponding to the traffic parameter 1 may be calculated, respectively based on the above Equation 4. For traffic parameter 1, i=1, N=5 in Equation 4, R and E correspond to the cells A and B, and $\beta_{R,i,j}$ and $\beta_{E,i,j}$ respectively correspond to the traffic distribution data corresponding to the traffic parameter 1 of the $j^{th}$ beam area in the cells A and B. For example, when j=1, $\beta_{R,i,j}$ and $\beta_{E,i,j}$ correspond to $a_{11}$ and $b_{11}$, respectively. After calculating the correlation between the traffic distribution data of the cells A and B corresponding to the two traffic parameters through Equation 4, whether the traffic distribution data of the cells A and B belong to the same category may be determined based on Equation 3.

Based on the above disclosure, classifying the historical traffic distribution data in each cell may be completed, and the corresponding historic environment data may be labeled according to the classification result of the traffic distribution data. The labeled historic environment data may be used as sample environment data among the training samples. For each type of the labeled environment data, sample traffic distribution data corresponding to the type of the environment data may be determined based on all the historic traffic distribution data corresponding to the type of environment data. The classification-labeled historic environment data and the corresponding sample traffic distribution data may be used as training samples for subsequent traffic prediction model, and the training of the model is completed based on the training samples. After the training is completed, when the traffic distribution data prediction is to be used, the obtained environment data of the cell may be input into the model, and the traffic distribution data of each beam area in the cell under the environment data may be obtained based on the output of the model.

Referring back to FIG. 8B, in the operation of traffic prediction, it is assumed that the beam areas included in a cell include beam area 1, beam area 2, ..., beam area k, beam area k+1, beam area k+2, beam area k+3. For each beam area in the cell, after obtaining the area-related information (such as historic environment data) of the cell, the traffic distribution data of each beam area in the cell may be obtained based on the trained traffic prediction model. As shown in FIG. 8B, the traffic distribution data of beam area k, beam area k+1, beam area k+2, and beam area k+3 may be expressed as $T_k$, $T_{k+1}$, $T_{k+2}$, $T_{k+3}$, respectively. For example, After, traffic prediction is performed for the beam areas included in the cell, in operation 860, the beam number to cover each beam area in the cell is calculated according to the predicted traffic distribution data of each beam area in the cell. The beam number may be determined according to the traffic information (the traffic distribution data of each beam area) and the beambook size limit of the cell. The beam number (that is, the total number of beams) to cover each beam area may be calculated according to the predicted traffic volume (that is, traffic distribution data, which may be referred to as the predicted traffic volume) in each beam area and the beambook size of the cell. In actual applications, due to resource limit, the beambook size is limited. The calculation method of the beam number for each beam area usually has the following characteristics:

1) the beam number may be a monotonically increasing function of the traffic volume, and the relationship between the traffic volume and the beam number may be linear or non-linear;

2) the sum of the beam numbers of all beam areas in the cell may not be greater than the maximum value supported by the beambook of the cell; and 3) to avoid coverage loopholes and ensure coverage effect, the beam number in each beam area may not be less than a set minimum beam number, that is, the set value of the minimum beam number of the beam area. The minimum beam number of the beam area is determined by the maximum beam width supported by the system. For example, the maximum beam width supported by the system may cover 4 beam areas, and then the minimum beam number may be set to ¼.

The following describes several examples for determining the beam number to cover each beam area in the cell based on the predicted traffic distribution data of each beam area in the cell.

Example 1

The relationship between the beam number for each of the beam areas and the predicted traffic volume of the beam area may be linear, and the beam number is proportional to the traffic volume.

Figure 10A:
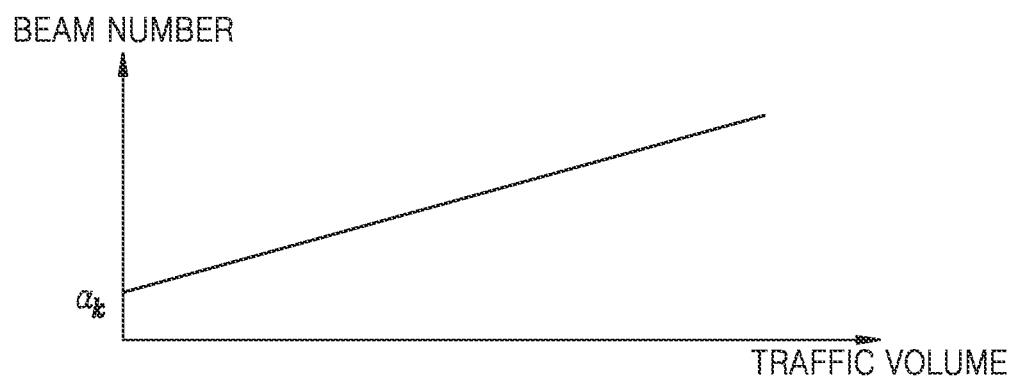
FIG. 10A illustrates a diagram of a relationship between beam number and traffic distribution data.

FIG. 10A illustrates a diagram of a relationship between beam number and traffic distribution data. Referring to FIG. 10A, the horizontal axis represents the predicted traffic volume, and the vertical axis represents the beam number selected in the beam area. When the beam number is proportional to the traffic volume, the beam number for each of the beam areas may be determined by the following Equation 5:

$$m_k = \max\left(P \cdot \frac{T_k}{\sum_{n=1}^{N} T_n}, \alpha_k\right) \tag{5}$$

In equation 5, $m_k$ is the calculated beam number of the beam area k, P is the total size of the beambook limit of the cell, $T_k$ is the predicted traffic volume of the beam area k, $\Sigma_{n=1}^{N} T_n$ is the total traffic volume of all the beam areas included in the cell, and $\alpha_k$ is the minimum beam number in the beam area k. The minimum beam number corresponding to each beam area may be the same value or different value, which may be configured by the system. For example, the maximum beam width supported by the system may cover 4 beam areas, and the minimum beam number corresponding to each beam area is the same, $\alpha_k = ¼$.

Example 2

The relationship between the beam number for each of the beam area and the predicted traffic volume in the beam area is a non-linear relationship, and the beam number is proportional to the traffic volume.

Figure 10B:
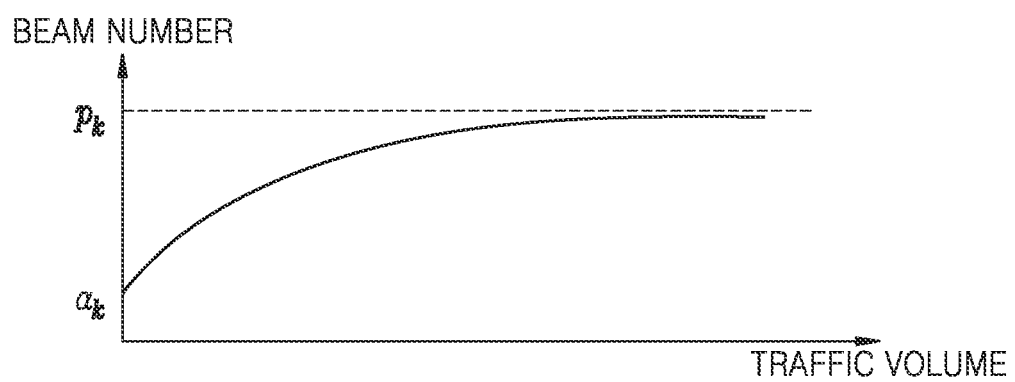
FIG. 10B illustrates a diagram of a relationship between beam number and traffic distribution data in another example.

FIG. 10B illustrates a diagram of a relationship between beam number and traffic distribution data in another example. Referring to FIG. 10B, the beam number for each beam area may be determined by the following equation 6:

$$m_k = \max\left(\frac{2p_k}{1+e^{-T_k}} - p_k, a_k\right) \quad (6)$$

In equation 6, $m_k$ is the calculated beam number of the beam area k, $T_k$ is the predicted traffic volume of the beam area k, and $a_k$ is the set minimum beam number of beam area k. $p_k$ is the set maximum beam number of the beam area k, that is, the set value of the maximum beam number of the beam area k. Similarly, the set maximum beam number corresponding to each beam area may be the same or different. It can be known from the foregoing description that the sum of the set values of the maximum beam numbers corresponding to all beam areas in the cell is not greater than the total size of the beambook limit of the cell.

Example 3

The beam number for each beam area may be determined by the traffic volume mapping relationship. For example, a range of the traffic volume is mapped to a beam number, the system may pre-store the mapping relationship table between the traffic volume and the beam number. For example, as shown in Table 1, each traffic volume range corresponds to a beam number. For each beam area, after determining the predicted traffic volume of each beam area, the beam number for each beam area may be determined through the mapping relationship. For example, assuming that the predicted traffic volume of a beam area is in a range greater than A1 and not greater than A2, the beam number for the beam area is ½.

TABLE 1

| Traffic volume $T_k$ | Beam number |
|---|---|
| $T_k = 0$ | 1/4 |
| $0 < T_k \leq A1$ | 1/3 |
| $A1 < T_k \leq A2$ | 1/2 |
| $A2 < T_k \leq A3$ | 1 |
| $A3 < T_k \leq A4$ | 2 |
| ... | ... |

As shown in the diagram in FIG. 8B, the beam numbers for beam areas k, beam area k+1, beam area k+2, and beam area k+3 are 6, 1, 0.5, and 0.5, respectively.

Referring back to FIG. 8B, after the beam number to cover each beam area in the cell is calculated according to the predicted traffic distribution data of each beam area in the cell, in operation 865, the beam widths in the horizontal dimension and vertical dimension of each beam area are determined according to the determined beam number and coverage range information of each beam area in the cell.

The beam widths in the horizontal dimension and vertical dimension of each beam area are determined according to the beam number of each beam area and the coverage range information of each beam area, and other configuration information. Assuming the cell includes N beam areas, the input information includes the beam number for each of the N beam areas, coverage range information of each beam area, and other configuration information of each beam area (such as number ratio information of the horizontal dimension and the vertical dimension). For example, the set m of beam numbers for N beam areas may be expressed as $m=\{m_1, m_2, \ldots, m_k, \ldots, m_N\}$, where $m_i$ ($1 \leq i \leq N$) represents the beam number for the $i^{th}$ beam area. The set of the coverage range information of N beam areas may be expressed as $A=\{A_1, A_2, \ldots, A_k, \ldots, A_N\}$, where $A_i$ ($1 \leq i \leq N$) represents the coverage range information for the $i^{th}$ beam area. The output information is the beam widths in the horizontal and vertical dimension of each beam area, for example, the set (H, V) of beam widths in the horizontal and vertical dimension for all beam areas in a cell may be expressed as following equation 7:

$$(H,V)=\{(H_{m_1},V_{m_1}), \ldots, (H_{m_2},V_{m_2}), \ldots, (H_{m_k},V_{m_k}), \ldots, (H_{m_N},V_{m_N})\}. \quad (7)$$

In equation 7, $H_{m_i}$ ($1 \leq i \leq N$) represents the beam width in the horizontal dimension of the $i^{th}$ beam area, and $V_{m_i}$ represents the beam width in the vertical dimension of the $i^{th}$ beam area.

The other configuration information refers to information for determining the ratio of the beams arranged in the horizontal direction and the beams arranged in the vertical direction for each beam area, that is, information that may reflect the beam widths or the beam width ratio of the vertical direction and horizontal direction, or information that may reflect the numbers of the vertical and horizontal beams or the vertical and horizontal beam number ratio in the beam area, such as the vertical and horizontal beam widths supported by the antenna system, or the vertical and horizontal beam number ratio configured by system parameters.

For the horizontal and vertical dimension beam number ratio, the ratios of the beam areas in a cell may be the same or different, and the ratios may be pre-configured or may be calculated in real time. For a pre-configured ratio, the ratio may be a preset ratio, or may be selected from a preset ratio set. In a case in which there is only one preset ratio, the horizontal and vertical dimension beam number ratio in all beam areas are the same.

For the case of selecting from the preset ratio set, the beam areas may be the same or different. If the horizontal and vertical dimension beam number ratio in each beam area is set to be the same, the ratios may be determined according to the widths in the horizontal and vertical dimension in the coverage range information of all beam areas. Furthermore, the ratios may be determined by the following operations: 1) calculating the sum of the widths in the horizontal dimension of the coverage range information of all beam areas and assuming the sum is Total_BW_h; 2) calculating the sum of the widths in the vertical dimension of the coverage range area information of all beams and assuming the sum is Total_BW_v; and 3) finding a ratio closest to Total_BW_h/Total_BW_v among a candidate ratio set, then the ratio closest to Total_BW_h/Total_BW_v is determined as the horizontal and vertical dimension beam number ratio.

If the horizontal and vertical dimension beam number ratio of each beam area may be set differently, the ratio of each beam area may be determined according to the widths in the horizontal and vertical dimension in the coverage range information of each beam area. For example, the ratio may be determined by the following operations: 1) for each beam area, calculating the ratio of the width $BW_{m_k,h}$ in the horizontal dimension to the width $BW_{m_k,v}$ in the vertical dimension of the coverage range information of the beam area, i.e., $BW_{m_k,h}/BW_{m_k,v}$; and 2) finding a ratio closest to $BW_{m_k,h}/BW_{m_k,v}$ among a candidate ratio set, then the ratio closest to $B_{m_k,h}/BW_{m_k,v}$ is determined as the horizontal and vertical dimension beam number ratio of the beam area.

For the case in which the ratio is calculated in real time, the beam areas may be the same or different. If the horizontal and vertical dimension beam number ratio in each beam area is set to be the same, the ratios may be determined according to the widths in the horizontal and vertical dimension in the coverage range information of all beam areas. For example, the ratios may be determined by the following operations: 1) calculating the sum of the widths in the horizontal dimension of the coverage range information of all beam areas and assuming the sum is Total_BW_h; 2) calculating the sum of the widths in the vertical dimension of the coverage range area information of all beam areas and assuming the sum is Total_BW_v; and 3) then the horizontal and vertical dimension beam number ratio is Total_BW_h/Total_BW_v.

If the horizontal and vertical dimension beam number ratio of each beam area may be set differently, the ratio of each beam area is determined according to the widths in the horizontal and vertical dimension in the coverage range information of each beam area. That is, the horizontal and vertical dimension beam number ratio of the beam area is $BW_{m_k\_h}/BW_{m_k\_v}$.

After determining the beam number for each beam area, the beam numbers in the horizontal and vertical dimension of each beam area may be calculated based on the other configuration information described above, and then the widths in the horizontal and vertical dimension of the beam area may be calculated according to the calculated beam numbers in the horizontal and vertical dimension, and the beam area coverage range information of the beam area, wherein the beams in each beam area may be distributed uniformly or non-uniformly.

The following describes the embodiments for determining beam width according to the disclosure.

Example 1

The horizontal dimension beam width and the vertical dimension beam width may be determined according to the beam number in each beam area, the coverage range information of the beam area, and the configured beam number ratio in the horizontal and vertical dimension of the beam area, respectively. From the foregoing description, it can be known that for the configured beam number ratio in the horizontal and vertical dimension, the beam areas may be the same or different, and the ratio may be a preset ratio or may be selected from a preset ratio set.

First, the horizontal dimension beam number and the vertical dimension beam number of each beam area may be calculated according to the beam number in each beam area, and the configured beam number ratio in the horizontal and vertical dimension. The product of the horizontal dimension beam number and the vertical dimension beam number is equal to the beam number in the beam area. For each beam area, assuming that the beam number ratio in the horizontal and vertical dimension of the beam area is pre-configured, and the configured beam number ratio in the horizontal and vertical dimension is X:Y. For a beam area k, assuming that the total beam number of the beam area k is $m_k$, and then the horizontal dimension beam number and vertical dimension beam number of the beam area k may be determined by the following equations 8 and 9:

$$\text{horizontal dimension beam number}: m_{k\_h} = \sqrt[2]{m_k \times X/Y} \quad (8)$$

$$\text{vertical dimension beam number}: m_{k\_v} = \sqrt[2]{m_k \times Y/X} \quad (9)$$

In equations 8 and 9, it satisfies $m_k = m_{k\_h} \times m_{k\_v}$.

Then, the horizontal dimension beam width and the vertical dimension beam width of the beam area are calculated according to the calculated horizontal and vertical dimension beam numbers and the beam area coverage range information of the beam area, respectively. Assuming the beams of the beam area k are distributed uniformly, and then the horizontal dimension beam width and the vertical dimension beam width of the beam area k may be determined by the following equations 10 and 11:

$$\text{horizontal dimension beam width}: H_{m_k=BW_{m_k\_h}/m_{k\_h}} \quad (10)$$

$$\text{vertical dimension beam width}: V_{m_k=BW_{m_k\_v}/m_{k\_v}} \quad (11)$$

In equations 10 and 11, $BW_{m_k\_h}$ and $BW_{m_k\_v}$ are the horizontal dimension width and the vertical dimension width in the beam area coverage range information of the beam area k, respectively.

Figure 11A:
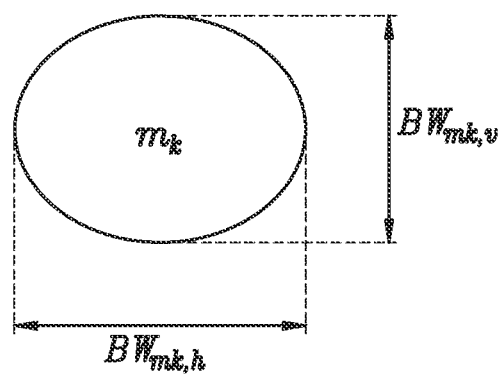
FIG. 11A illustrates a diagram of coverage range information of one beam area.

FIG. 11A illustrates a diagram of coverage range information of one beam area. For example, referring to FIG. 11A, the elliptical area represents the coverage range of the beam area k. The horizontal dimension width of the beam area k is $BW_{m_k\_h}$, and the vertical dimension width is $BW_{m_k\_v}$, and $m_k$ represents the beam number for the area. Assuming that the number of the beams arranged in the horizontal direction, i.e., the horizontal dimension beam number is $m_{k\_h}$, and the vertical dimension beam number is $m_{k\_v}$.

Figure 11B:
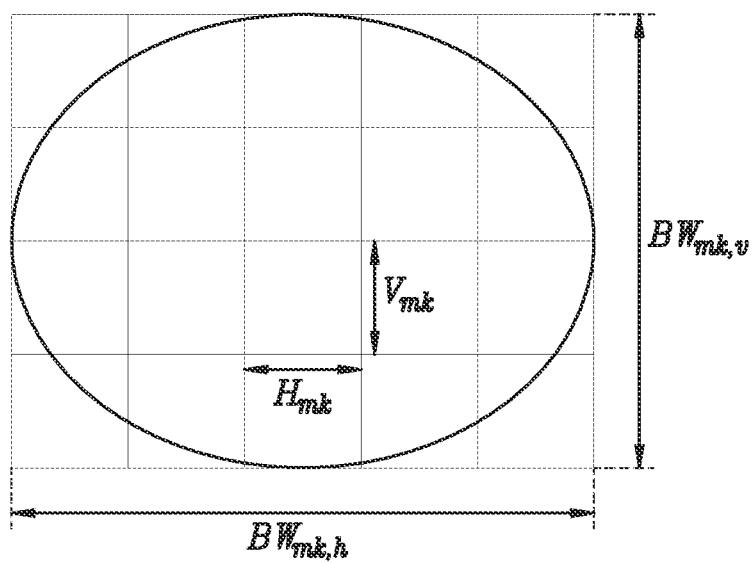
FIG. 11B illustrates a diagram of horizontal dimension beam width and vertical dimension beam width of the beam area as shown in FIG. 11A.

FIG. 11B illustrates a diagram of horizontal dimension beam width and vertical dimension beam width of the beam area as shown in FIG. 11A. FIG. 11B is an enlarged diagram of the beam area in FIG. 11A. Referring to FIB. 11B, the beam for the beam area is $m_k=20$, where $m_{k\_h}=5$, $m_{k\_v}=4$, and then the horizontal dimension beam width in the beam area is $H_{m_k}=BW_{m_k\_h}/5$, and the vertical dimension beam width is $V_{m_k}=BW_{m_k\_v}/4$.

Example 2

The horizontal dimension beam width and the vertical dimension beam width of each beam area may be determined according to the beam number in each beam area, the coverage range information of the beam area, and the beam number ratio in the horizontal and vertical dimension calculated in real time, respectively. As mentioned above, according to the disclosure, the beam number ratio in the horizontal and vertical dimension may be calculated in real time. In this case, first, the horizontal dimension beam number and the vertical dimension beam number of each beam area may be calculated according to the beam number in each beam area, and the beam number ratio in the horizontal and vertical dimension in each beam area calculated in real time. The product of the horizontal dimension beam number and the vertical dimension beam number is equal to the beam number in the beam area. Assuming that the beam number ratio in the horizontal and vertical dimension calculated in real time is X:Y, and the total beam number of the beam area k is $m_k$, and then the horizontal dimension beam number and vertical dimension beam number of the beam area k may be determined by the following equations 12 and 13:

$$\text{horizontal dimension beam number}: m_{k\_h} = \sqrt[2]{m_k \times X/Y} \quad (12)$$

$$\text{vertical dimension beam number}: m_{k\_v} = \sqrt[2]{m_k \times Y/X} \quad (13)$$

In equations 12 and 13, $m_k = m_{k\_h} \times m_{k\_v}$.

Then, the horizontal dimension beam width and the vertical dimension beam width of the beam area are calculated according to the calculated horizontal and vertical dimension beam numbers and the beam area coverage range information of the beam area k, respectively. Assuming the beams of the beam area k are distributed uniformly, and then the horizontal dimension beam width and the vertical dimension beam width of the beam area k may be determined by the following equation 14 and 15:

horizontal dimension beam width: $H_{m_{k}=BW_{m_{k},h}}/m_{k\_h}$ (14)

vertical dimension beam width: $V_{m_{k}=BW_{m_{k},v}}/m_{k\_v}$ (15)

In equations 14 and 15, $BW_{m_{k},h}$ and $BW_{m_{k},v}$ are the horizontal dimension width and the vertical dimension width in the beam area coverage range information of the beam area k, respectively.

Example 3

The horizontal dimension beam width and the vertical dimension beam width of each beam area may be determined according to the beam number in each beam area, the coverage range information of the beam area, and the configured beam number ratio in the horizontal and vertical dimension, respectively.

First, the horizontal dimension beam number and the vertical dimension beam number of each beam area may be calculated according to the beam number in each beam area, and the configured beam number ratio in the horizontal and vertical dimension. The sum of the horizontal dimension beam number and the vertical dimension beam number is equal to the beam number in the beam area. For a beam area k, assuming that the configured beam number ratio in the horizontal and vertical dimension is X:Y, and the total beam number of the beam area k is $m_k$, and then the horizontal dimension beam number and the vertical dimension beam number of the beam area k may be determined by the following equations 16 and 17:

$$\text{horizontal dimension beam number}: m_{k\_h} = \frac{X * m_k}{X + Y} \quad (16)$$

$$\text{vertical dimension beam number}: m_{k\_v} = m_k * \left(1 - \frac{X}{X + Y}\right) \quad (17)$$

In equation 16 and 17, it satisfies $m_k=m_{k\_h}+m_{k\_v}$.

Then, the horizontal dimension beam width and the vertical dimension beam width are calculated according to the calculated horizontal and vertical dimension beam numbers and the coverage range information of the beam area, respectively. Assuming the beams of the beam area k are distributed uniformly, and then the horizontal dimension beam width and the vertical dimension beam width of the beam area k may be determined by the following equation 18 and 19:

horizontal dimension beam width: $H_{m_{k}=BW_{m_{k},h}}/m_{k\_h}$ (18)

vertical dimension beam width: $V_{m_{k}=BW_{m_{k},v}}/m_{k\_v}$ (19)

In equation 18 and 19, $BW_{m_{k},h}$ and $BW_{m_{k},v}$ are the horizontal dimension width and the vertical dimension width in the beam area coverage range information of the beam area k, respectively.

Example 4

The horizontal dimension beam width and the vertical dimension beam width of each beam area may be determined according to the beam number in each beam area, the coverage range information of the beam area, and the beam number ratio in the horizontal and vertical dimension calculated in real time, respectively.

First, the horizontal dimension beam number and the vertical dimension beam number of each beam area may be calculated according to the beam number in each beam area, and the beam number ratio in the horizontal and vertical dimension calculated in real time. The product of the horizontal dimension beam number and the vertical dimension beam number is equal to the beam number in the beam area. For a beam area k, assuming that the beam number ratio in the horizontal and vertical dimension of the beam area calculated in real time is X:Y, and the total beam number of the beam area k is $m_k$, and then the horizontal dimension beam number and the vertical dimension beam number of the beam area k may be determined by the following equations 20 and 21:

$$\text{horizontal dimension beam number}: m_{k\_h} = \frac{X * m_k}{X + Y} \quad (20)$$

$$\text{vertical dimension beam number}: m_{k\_v} = m_k * \left(1 - \frac{X}{X + Y}\right) \quad (21)$$

In equation 20 and 21, it satisfies $m_k=m_{k\_h}+m_{k\_v}$.

Then, the horizontal dimension beam width and the vertical dimension beam width are calculated according to the calculated horizontal and vertical dimension beam numbers and the coverage range information of the beam area, respectively. Assuming the beams of the beam area k are distributed uniformly, and then the horizontal dimension beam width and the vertical dimension beam width of the beam area k may be determined by the following equations 22 and 23:

horizontal dimension beam width: $H_{m_{k}=BW_{m_{k},h}}/m_{k\_h}$ (22)

vertical dimension beam width: $V_{m_{k}=BW_{m_{k},v}}/m_{k\_v}$ (23)

In equations 22 and 23, $BW_{m_{k},h}$ and $BW_{m_{k},v}$ are the horizontal dimension width and the vertical dimension width in the beam area coverage range information of the beam area k, respectively.

Referring back to FIG. 8B, it is assumed that the beam numbers for the beam area k and the beam area k+1 is 6 and 1, respectively, both of which are not less than 1. The horizontal dimension beam width and the vertical dimension beam width of the two beam areas may be determined based on the beam number for each of the two beam areas and the coverage range information of the beam areas. As shown in the FIG. 8B, the horizontal dimension beam width and the vertical dimension beam width of the beam area k are represented as $H_{m_k}$ and $V_{m_k}$, the horizontal dimension beam width and the vertical beam width of the beam area k+1 are represented as $H_{m_{k+1}}$ and $V_{m_{k+1}}$. For the beam area k+2 and the beam area k+3, the beam numbers for both of the beam areas are 0.5, and the two areas may be used as an united area. As shown in the FIG. 8B, the horizontal dimension beam width and the vertical dimension beam width of the united area are $H_{m_{k23}}$ and $V_{m_{k23}}$, the two beam areas may share the same beam.

After the horizontal dimension beam width and the vertical dimension beam width are determined, in operation 870, all beams of all beam areas from the system candidate beam set or candidate beam subsets is determined to generate a beambook of the cell, based on the determined beam number and beam width of each beam area in the cell. In operation 875, the generated beambook is applied.

From the foregoing description, it can be known that when determining the beams of each beam area, the determination method may be different for different system configurations. If all candidate beams configured by the system are included in a set (that is, a candidate beam set), all beams of each beam area may be determined from the set according to the determined beam number and beam width of each beam area, and the beam width of the candidate beam. If all candidate beams configured by the system are included in the plurality of candidate beam subsets each of which has different beam width, the corresponding subset may be selected from the plurality of candidate beam subsets according to the beam width of each beam area and the beam width of each of the subsets, and then the corresponding number of beams may be selected from the selected subset.

Figure 12:
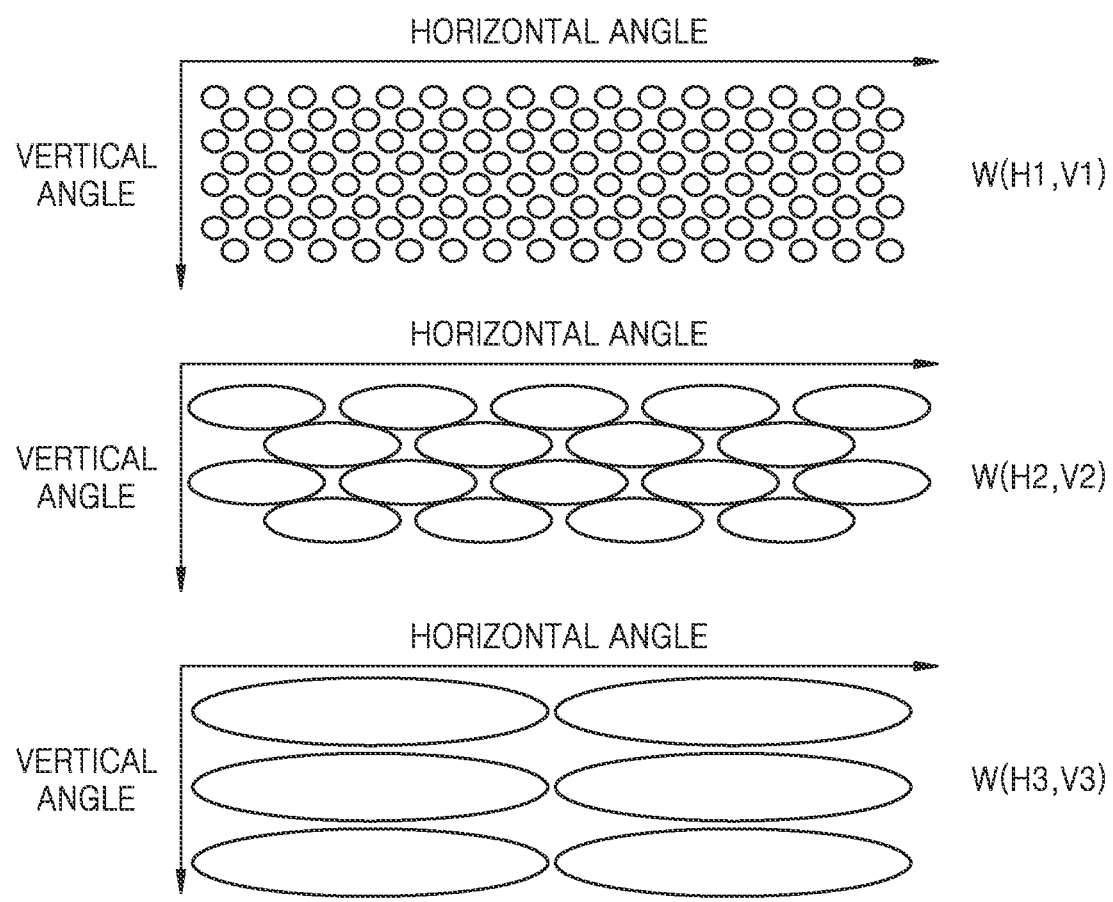
FIG. 12 illustrates a diagram of candidate beam subsets of different beam widths.

FIG. 12 illustrates a diagram of candidate beam subsets of different beam widths. Candidate beam subsets with different beam widths may be supported by the system. Referring to FIG. 12, for example, candidate beam subsets may include three different types of beam widths that represent as W(H1, V1), W(H2, V2), W(H3, V3), respectively. Each ellipse in the FIG. 12 represents the horizontal dimension beam width and the vertical dimension beam width of a beam. For example, the horizontal dimension beam width (that is, the horizontal angle) of the subset W(H1, V1) is H1, the vertical dimension beam width (that is, the vertical angle) thereof is V1; the horizontal dimension beam width of the subset W(H2, V2) is H2, the vertical dimension beam width thereof is V2; the horizontal dimension beam width of the subset W(H3, V3) is H3, and the vertical dimension beam width thereof is V3.

After determining the determined beam number and the beam width of each beam area in the cell, a criteria (such as a minimum distance criterion, wherein the distance refers to the distance from the selected beam to the center of the beam area) may be used to select beams for each beam area from the beam set (candidate beam set) supported by the system or subsets of the beam subsets (candidate beam subsets), and all selected beams form the final beambook.

For the beam area with a beam number greater than or equal to 1 (the first threshold value), the beams may be selected from the beam set supported by the system according to a criteria according to the determined beam width of the beam area. For convenience of description, the method may be called beambook determination method I.

For the beam area with a beam number less than 1, the beam area and neighboring areas each having the beam number less than 1 may be combined to an united area. Beams for the united area may be uniformly selected, that is, a criterion is used to select the number of beams for the united area from the beam set. For convenience of description, the method may be called beambook determination method II.

The following describes the optional implementation of the step in conjunction with some examples. In these examples, the minimum distance criterion is used as the criterion for determining the beambook of each beam area, where the distance in the minimum distance criterion refers to the distance from the selected beam to the beam area. In addition, for the beambook determination method II, in these examples, the description is given through an example in which a plurality of beam areas shares one beam.

Example 1

In the example 1, the system supports a plurality of candidate beam subsets with different beam widths. When determining the beams of each beam area, first, corresponding beam subset (that is, the candidate beam subset) for each beam area may be determined from the beam set supported by the system according to the horizontal and vertical dimension beam widths, and then the number of beams may be selected from the determined subset, and all the selected beams form the final beambook.

For the beam area with a beam number greater than or equal to 1, the beambook determination method I is adopted. That is, the corresponding beam subset is determined according to the calculated beam width of the beam area, and then the number of beams is selected from the beam subset according to the minimum distance criterion. For the beam area with a beam number less than 1, the beambook determination method II is adopted. That is, the beam area and neighboring areas each having the same beam number may be combined to an united area, and beams for the united area may be uniformly selected. Because the number of the beams for each beam area in the united area is the same, and the corresponding beam width is also the same, the number of the beams is selected from the beam subset with the corresponding width by using the minimum sum distance criterion.

The beambook determination method I in the example may include: assuming the center point vector of beam area k is $u_k$, that is, $u_k$ represents a direction vector of the center location of the beam area k; and the calculated beam width in this area is $(H_{m_k}, V_{m_k})$, where $H_{m_k}$ and $V_{m_k}$ represent the horizontal dimension width and the vertical dimension width of the beam area k, respectively, and then the distance between each beam area in the beam subset and the center point of the beam area k (which may also be simply referred to as beam distance) based on the dot product of the two vectors, and the calculation method is as following equation 24:

$$d_n = 1/\text{abs}(u_k' \times w_n) \tag{24}$$

In equation 24, $w_n$ is a direction vector of the $n^{th}$ beam in the beam subset $W(H_{m_k}, V_{m_k})$ of which the beam width is $(H_{m_k}, V_{m_k})$, $u_k'$ represents the conjugate transpose of $u_k$, $\text{abs}(u_k' \times w_n)$ represents the absolute value of the dot product operation result of $u_k' \times w_n$, and $d_n$ represents the distance between the $n^{th}$ beam of the beam subset and the beam area k.

Figure 13A:
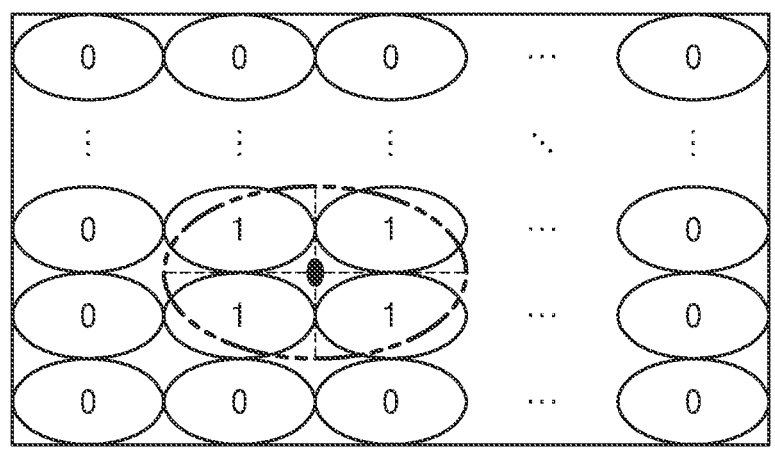
FIG. 13A illustrates a diagram of a beam subset.

FIG. 13A illustrates a diagram of a beam subset $W(H_{m_k}, V_{m_k})$. The beam subset is determined according to the horizontal dimension beam width and the vertical dimension beam width of the beam area, i.e., $(H_{m_k}, V_{m_k})$. In FIG. 13A, the set composed of beams in the circle surrounded by the dotted line is a beam subset, where "0" indicates a corresponding unselected beam, and "1" indicates a corresponding selected beam from the candidate beam subset.

After the calculating the distance between each of the beams in the beam subset and the beam area k, all the calculated beam distances may be sorted, and $m_k$ beams (the number of beams for the beam area k) with smallest distances may be selected and stored in the beambook of the cell.

The beambook determination method II in this example may include: assuming the calculated beam width of the beam area k is $(H_{m_k}, V_{m_k})$, and an united area includes K beam areas, and then, firstly, the united beam area that is composed of the beam area k and neighboring beam areas having the same beam number as the beam area k may be determined. If a total of A areas (including the beam area k itself) are found, then $K = \min(A, 1/m_k)$, that is, the number of beam areas included in the united area is a smaller value between a number of beam areas satisfying condition and a number of beam areas covered by one beam to ensure the coverage of each beam area in the united area. Secondly, the sum distances between all beams in the beam subset and the center points of the beam areas may be calculated based on the dot product method. Finally, a beam corresponding to a smallest beam distance is selected and stored in the beambook. The calculation method of the sum distances is as following equation 25:

$$d_n = \Sigma_{s=1}^{K} 1/\text{abs}(u_{k_s}' \times w_n) \qquad (25)$$

In equation 25, $w_n$ is a direction vector of the $n^{th}$ beam in the beam subset $W(H_{m_k}, V_{m_k})$ of which the beam width is $(H_{m_k}, V_{m_k})$, $u_{k_s}$ is a center point direction vector of the $s^{th}$ beam area in the united beam area, and $u_{k_s}'$ represents the conjugate transpose of the center point direction vector $u_{k_s}$, $s=1, 2, \ldots, K$.

After the calculating the sum distances of the beams in the beam subset, a beam corresponding to a smallest beam distance (sum distance) may be selected as the beam of the united area, and stored into the beambook of the cell.

Figure 13B:
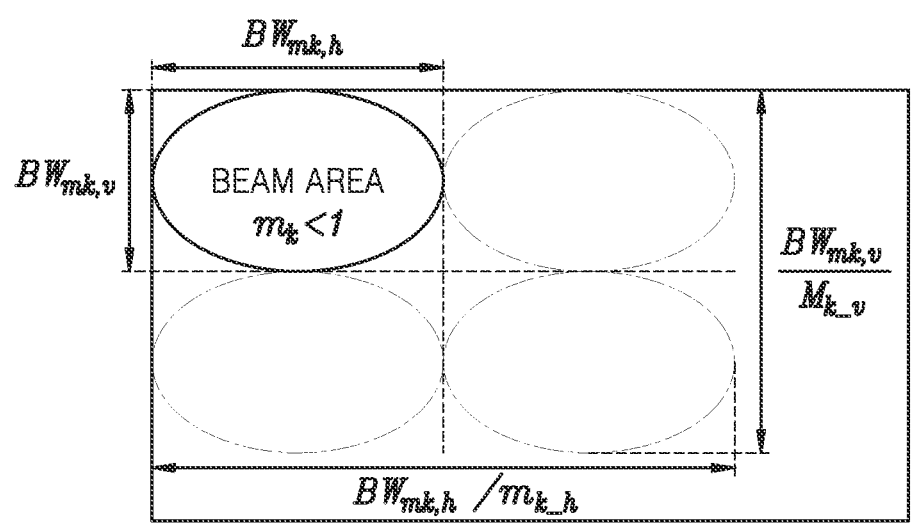
FIG. 13B illustrates a diagram of beam areas included in an united beam area.

FIG. 13B illustrates a diagram of beam areas included in an united beam area.

Referring to FIG. 13B, the united area includes four beam areas of which the number of beams is less than 1 ($m_k$<1 as shown). The four beam areas may require the same number of beams, and the horizontal and vertical dimension widths of the coverage range of the four beam areas are also the same. For example, for the beam area k in the upper left corner, it is assumed that horizontal dimension width and vertical dimension width of the beam area k are $BW_{m_k,h}$ and $BW_{m_k,v}$, respectively, and the beam number in the horizontal and vertical dimension are $m_{k\_h}$ and $m_{k\_v}$, respectively, then the horizontal dimension beam width and the vertical dimension beam width of the united area are $BW_{m_k,h}/m_{k\_h}$ and $BW_{m_k,v}/m_{k\_v}$, and then candidate beams for the united beam area may be filtered out from the candidate beam set based on the widths, and the beams of the united area may be determined from the candidate beams based on the above-mentioned minimum distance principle.

Figure 13C:
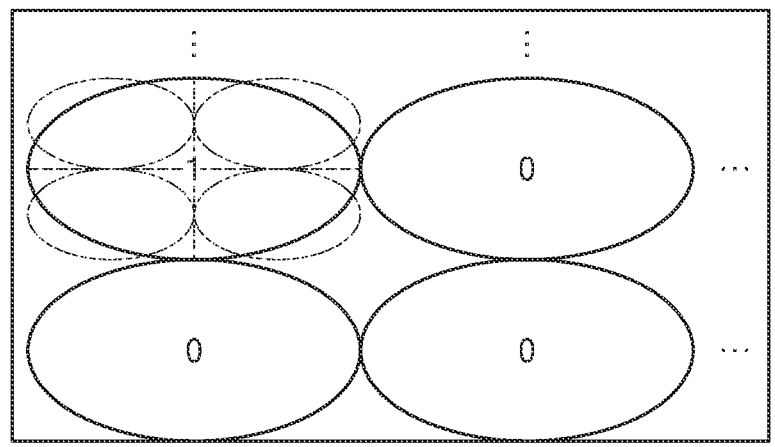
FIG. 13C illustrates a diagram of beams of the united area as shown in FIG. 13B.

FIG. 13C illustrates a diagram of beams of the united area as shown in FIG. 13B. Referring to FIG. 13C, a beam corresponding to "1" is a beam of the united area selected from the candidate beam set, and a beam corresponding to "0" represents an unselected beam, and the four dashed ellipses represents the four beam areas included in the united area.

Example 2

An another implementation for the beambook determination is provided in Example 2. In example 2, for a beam of which the beam number is less than 1, the united area includes the beam area and the neighboring beam areas each having the beam number less than 1, beams for the united area are uniformly selected. Because the number of beams for each beam area in the united area may be different, a beam number may be selected from the beam subset with corresponding width by adopting minimum sum distance principle.

The beambook is determined as following operations:

Assuming the calculated beam width of the beam area k is $(H_{m_k}, V_{m_k})$, and a united area includes K beam areas, and then, firstly, the united beam area that is composed of the beam area k and neighboring beam areas each having the beam number less than 1 may be determined. The sum of beam numbers in the united area is less than or equal to 1.

Secondly, the sum distances between all beams in the beam subset and the center points of the beam areas may be calculated based on the dot product method, and the calculation method is as following equation 26:

$$d_n = \Sigma_{s=1}^{K} 1/\text{abs}(u_{k_s}' \times w_n) \qquad (26)$$

In equation 26, $w_n$ is a direction vector of the $n^{th}$ beam in one or more beam subsets corresponding to all beam widths in the united beam area, $u_{k_s}$ is a center point direction vector of the $s^{th}$ beam area in the united beam area, and $u_{k_s}'$ represents the conjugate transpose of $u_{k_s}$, $s=1, 2, \ldots, K$.

Finally, a beam corresponding to a smallest beam distance is selected and stored in the beambook.

Example 3

In example 3, by using the minimum distance criterion, the beam for each beam area is selected from beam set supported by the system, and all the selected beams form the final beambook.

For the beam area with beam number greater than or equal to 1, the beambook determination method I is adopted, that is, the beam number is selected from the beam set supported by the system according to the minimum distance criterion.

For beam area with beam number less than 1, the beambook determination method II is adopted, that is, the beam area and neighboring beam areas that have the same beam number are combined into a united area, and beams for the united area are uniformly selected. The beam number is selected from the beam set supported by the system by adopting the minimum sum distance criterion.

The beambook determination method I in the example may include: assuming the center point direction vector of the beam area k is $u_k$, the distances between all the beams in the beam subset and the center point of the beam area k based on the dot product operation, and the calculation method is as following equation 27:

$$d_n = 1/\text{abs}(u_k' \times w_n) \qquad (27)$$

In equation 27, $w_n$ is a direction vector of the $n^{th}$ beam in the beam set W supported by the system, and $u_k'$ represents the conjugate transpose of $u_k$. After the calculating the distance between each of the beams in the beam subset and the beam area k, all the calculated beam distances may be sorted, and $m_k$ beams with smallest distances may be selected as the beams in the beam area k, and stored in the beambook of the cell.

The beambook determination method II in this example may include: assuming an united area includes K beam areas, and firstly, the united beam area that is composed of the beam area k and neighboring beam areas that have the same beam number as the beam area k may be determined. If a total of A areas (including the beam area k itself) are found, then K=min(A, 1/$m_k$). Secondly, the sum distances between all beams in the beam subset supported by the system and the center points of the beam areas may be calculated based on the dot product operation and the calculation method is as following equation 28:

$$d_n = \Sigma_{s=1}^{K} 1/\text{abs}(u_{k_s}' \times w_n) \qquad (28)$$

In equation 28, $w_n$ is a direction vector of the $n^{th}$ beam in the beam set W supported by the system, $u_{k_s}$ is a center point direction vector of the $s^{th}$ beam area in the united beam area, and $u_{k_s}'$ represents the conjugate transpose of $u_{k_s}$, $s=1, 2, \ldots, K$. Finally, a beam corresponding to a smallest beam distance is selected and stored in the beambook.

Example 4

The difference between example 3 and Example 4 is that another implementation of the beambook determination method II is provided in this example 3. In this example 3, for a beam of which the beam number is less than 1, the united area includes the beam area and neighboring beam areas that have the beam number less than 1, the sum of beam numbers in the united area is not greater than 1, and beams for the united area are uniformly selected. Because the beam number of each beam area in the united area may be different, the beam number is selected from the beam subset with corresponding width by adopting the minimum sum distance criterion.

The beambook determination method II in this example 4 may include: assuming a united area includes K beam areas, and then, firstly, the united beam area that is composed of the beam area k and neighboring beam areas that have the beam number less than 1 may be determined. The sum of beam numbers in the united area is less than or equal to 1. Secondly, the sum distances between all beams in the beam set supported by the system and the center points of the beam areas may be calculated based on the dot product operation, and the calculation method is as following equation 29:

$$d_n = \sum_{s=1}^{K} 1/\text{abs}(u'_{k_s} \times w_n)$$

In equation 29, $w_n$ is a direction vector of the $n^{th}$ beam in the beam set W supported by the system, $u_{k_s}$ is a center point direction vector of the $s^{th}$ beam area in the united beam area, and $u'_{k_s}$ represents the conjugate transpose of $u_{k_s}$, s=1, 2, . . . , K. After the calculating the sum distances of the beams in the beam subset, a beam corresponding to a smallest beam distance may be selected and stored in the beambook of the cell.

After determining the beam in each of the beam area and obtaining the beambook of the cell, the data transmission service may be provided for the users in the cell based on the determined beam. Referring back to FIG. 8B, for the hotspot area, i.e., the beam area k, the determined 6 narrow beams are used to provide service for the beam area to improve the coverage of the area. For the medium load area, i.e., the beam area k+1, a relatively wide beam may be used to provide service. For the low load area, i.e., the beam area k+1 and beam area k+2, a wider beam may be used to provide services for the two beam areas, to achieve the solution for adaptively determining the beambook according to the traffic distribution. According to the embodiment of the disclosure, the beam width and the corresponding number in the beambook may be adjusted in real time according to changes in the traffic; for low traffic areas, less and wider beam may be used to cover to ensure system performance and coverage; and for hotspot areas, more and narrower beams are assigned to improve system performance and user experience, and improve the beam utilization rate.

In terms of a beam, the shape of the beam may be regarded as Sinc function, denser and narrower beam distribution may bring higher reception signal power gain, so the denser and narrower beam distribution may effectively improve signal power and system capacity in a hotspot area.

Figure 14:
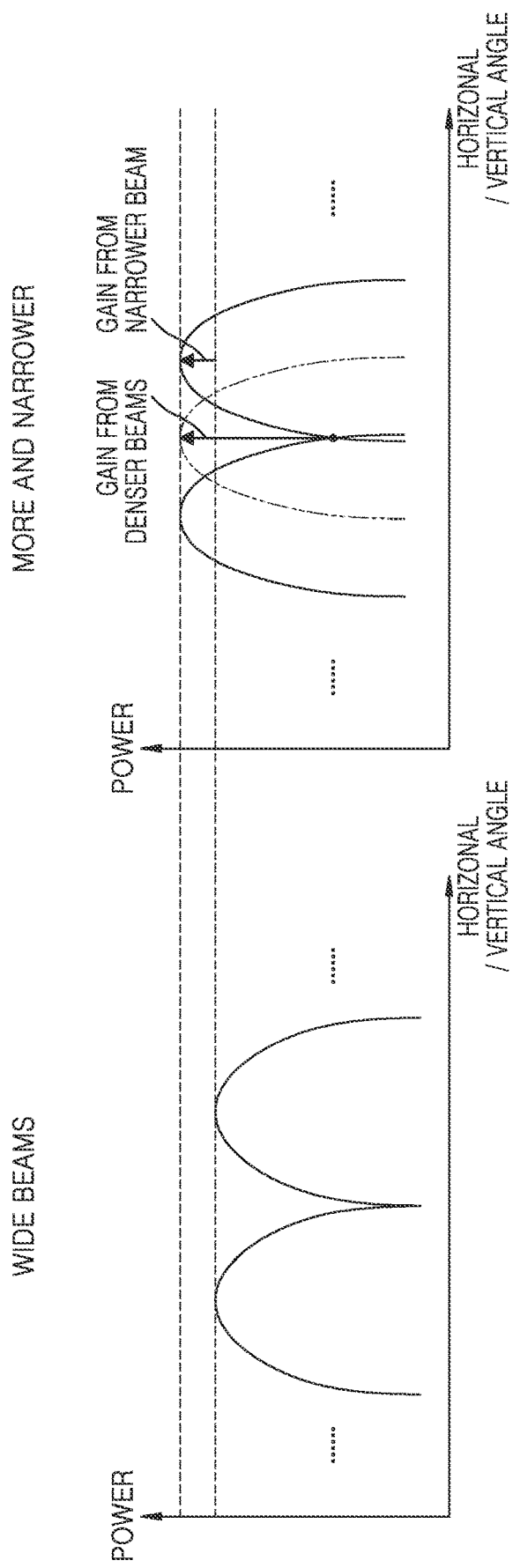
FIG. 14 illustrates a diagram of signal reception power of a wide beam and a narrow beam.

FIG. 14 illustrates a diagram of signal reception power of a wide beam and a narrow beam. Referring to FIG. 14, the horizontal axis represents the beam width (the horizontal/vertical angle), and the vertical axis represents the reception power of the beam. It can be seen from the FIG. 14, the signal reception power of the narrow beam is relatively higher and the performance is better, comparing with the wide beam. The gain of the narrow beam is the reception gain corresponding to the wide beam, while the wide beam has a larger coverage range capable of ensuring comprehensive coverage of the low load areas.

The following table shows the comparison results between the conventional beam management scheme and the adaptive beambook management scheme according to an embodiment of the disclosure. It can be seen from the table, in the conventional beam management scheme, the beams in the beambook of the cell are fixed and the coverage enhancement cannot be provided for various traffic distribution in the cell, and while the adaptive beambook management scheme based on the embodiment of the disclosure may adaptively assign beams according to the traffic distribution of the cell, which can better satisfy the actual application requirements.

| Conventional beambook management scheme | | Adaptive beambook management scheme | |
|---|---|---|---|
| Feature | Issue | Feature | Effect |
| Beams in beambook are fixed. | Low beam utilization rate, and coverage enhancement cannot be provided for various traffic distribution in the cell. | Adaptively assigning beams in the beambook according to predicted traffic distribution. | Improvement on signal power gain and system capacity in hotspot area. |

To further illustrate the improvement of system performance and hotspot area performance brought by the beam determination scheme provided by the disclosure, the following describes the effects of the embodiments of the disclosure in conjunction with simulation results by using system-level simulation tools to evaluate the performance for three different scenarios. The simulation assumptions are shown in the following table:

| | |
|---|---|
| Cell radius | 100 m |
| User number | 200 |
| User height | 1.5 m |
| Traffic distribution scenarios | Scenario 1: 0% distributed in hotspot |
| | Scenario 2: 80% distributed in hotspot |
| | Scenario 3: 90% distributed in hotspot |
| Channel model | 3D UMi (3D urban micro cell), LOS (line of sight) |
| Carrier frequency | 39G |
| TDD | 4:1 |
| Hotspot size (length * width * height) (scenario 2/3) | scenario 2: 50 m × 15 m × 3 m (1 floor) scenario 3: 50 m × 15 m × 18 m (6 floors) |
| User distribution | Random |
| BS antenna element number per panel | 16 × 32 |
| BS panel number 4 | 4 |
| User antenna element number per panel | 1 × 16 |
| User panel number | 2 |

Figure 15A:
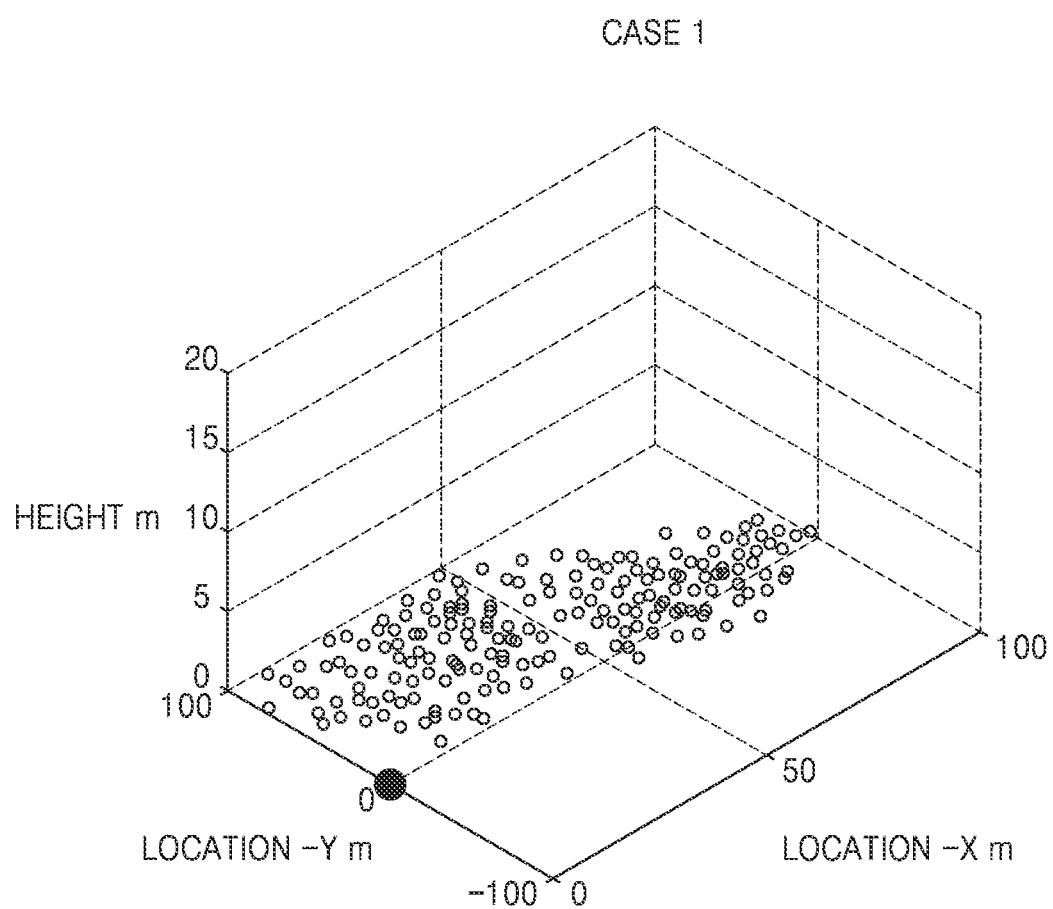
Figure 15B:
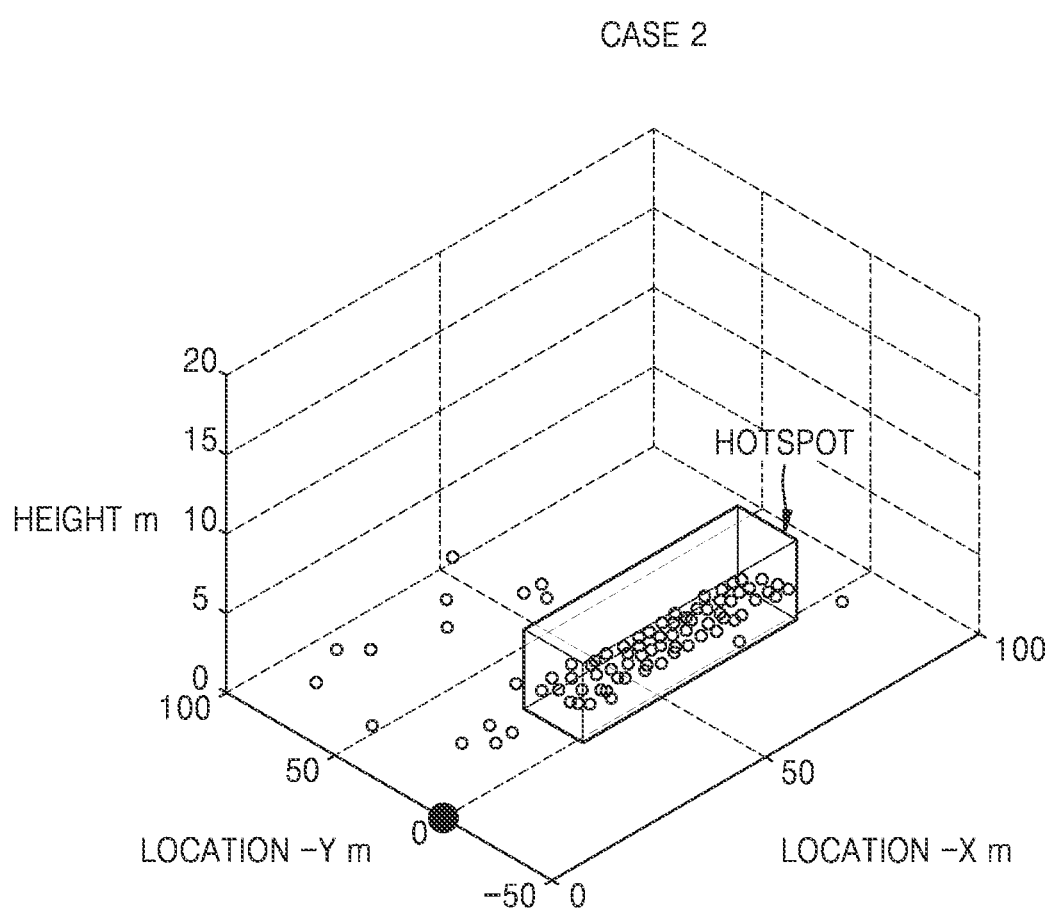

FIGS. 15A, 15B and 15C illustrate diagrams of three different application scenarios in simulations of the disclosure, respectively. In the simulations, diagrams of three different application scenarios in the simulations of the disclosure are shown in FIG. 15A, FIG. 15B, and FIG. 15C, respectively. In the three-dimensional coordinate axis shown in the FIG. 15A, FIG. 15B, and FIG. 15C, the center point location of the cell is shown by the black dot on the Y axis, that is, the location of "●". In the simulations, the coverage area of the three cells may be understood as a hexagon in which the center point location is taken as the circle center and the radius is 100 meters. FIG. 15A, FIG. 15B, and FIG. 15C show schematic diagrams of a cell in which each of the distances from all user coordinate points to the center point location is not beyond 100 m (only one cell is shown in each of the figures, which is a part of one third of the hexagon). The scenarios are as follows:

Scenario 1: as shown in the schematic diagram of the scenario 1 (Case 1) in FIG. 15A, 0% is located in the hotspot area, i.e., 0% of users are located in the hotspot area, that is, all users are uniformly distributed in the cell, and are distributed on the outdoor ground, no hotspot area;

Scenario 2: as shown in the schematic diagram of the scenario 2 (Case 2) in FIG. 15B, 80% is distributed in the hotspot area (the hotspot shown in the FIG. 15B), and the size of the hotspot area is 50 m×15 m×3 m (1 floor). It can be understood that 50 m×15 m is ground coverage area of the hotspot area, and 3 m is the height of the area, that is, 80% of the users are located on a 1-floor hotspot area, 80% of the users uniformly distribute on the 1-floor, and the rest 20% of users are located outside hotspot area and uniformly distribute;

Scenario 3: as shown in the schematic diagram of the scenario 3 (Case 3) in FIG. 15C, 90% is distributed in the hotspot area, and the size of the hotspot area is 50 m×15 m×18 m (including 6 floors), that is, 90% of users are located in a 6-floor hotspot area and uniformly distribute on floor 1 to 6, and the rest 10% of users are distributed outside the hotspot area, and uniformly distributed.

In all scenarios, the beambook size is 64, that is, the beambook size limit is 64. In other words, the maximum number of beams supported by the system is 64.

For the above three scenarios, the conventional beam management scheme and the beam determination scheme provided in the embodiments of the disclosure are used to generate the beambook of the cell, respectively, and based on the generated beambook, CDF (Cumulative Distribution Function) simulation of user throughput (that is, UE throughout) is performed on the microcells in the three scenarios.

Figure 16B:
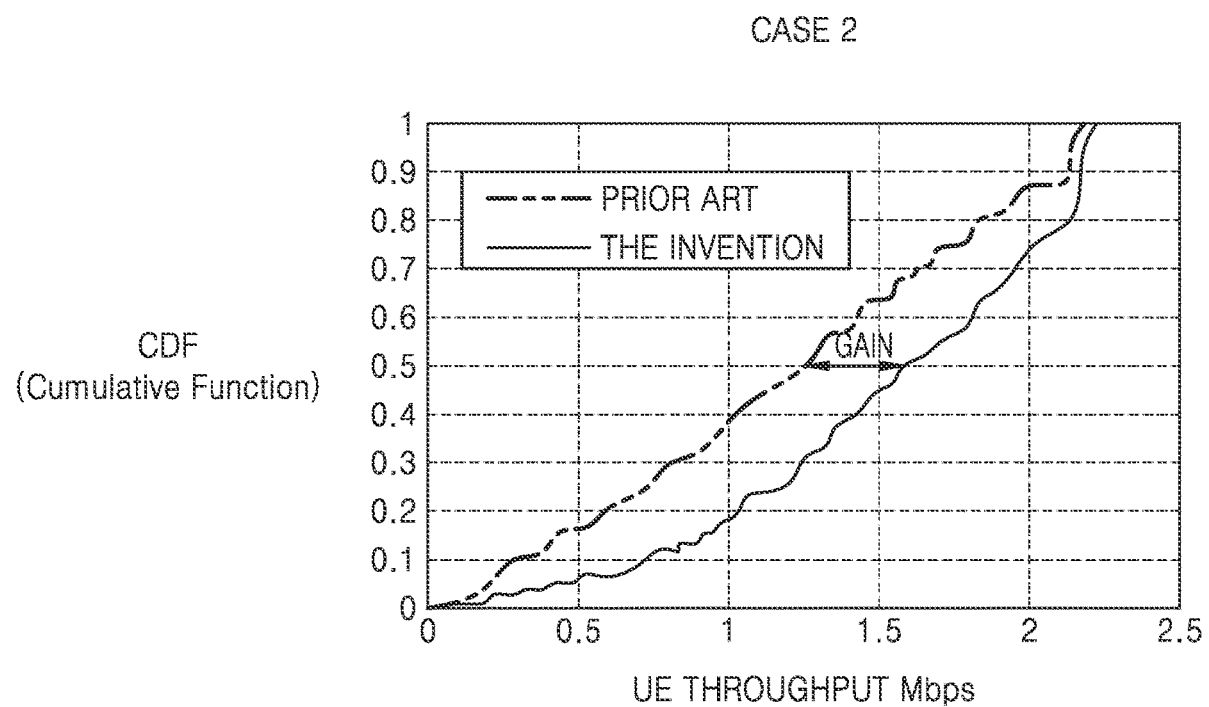
Figure 16C:
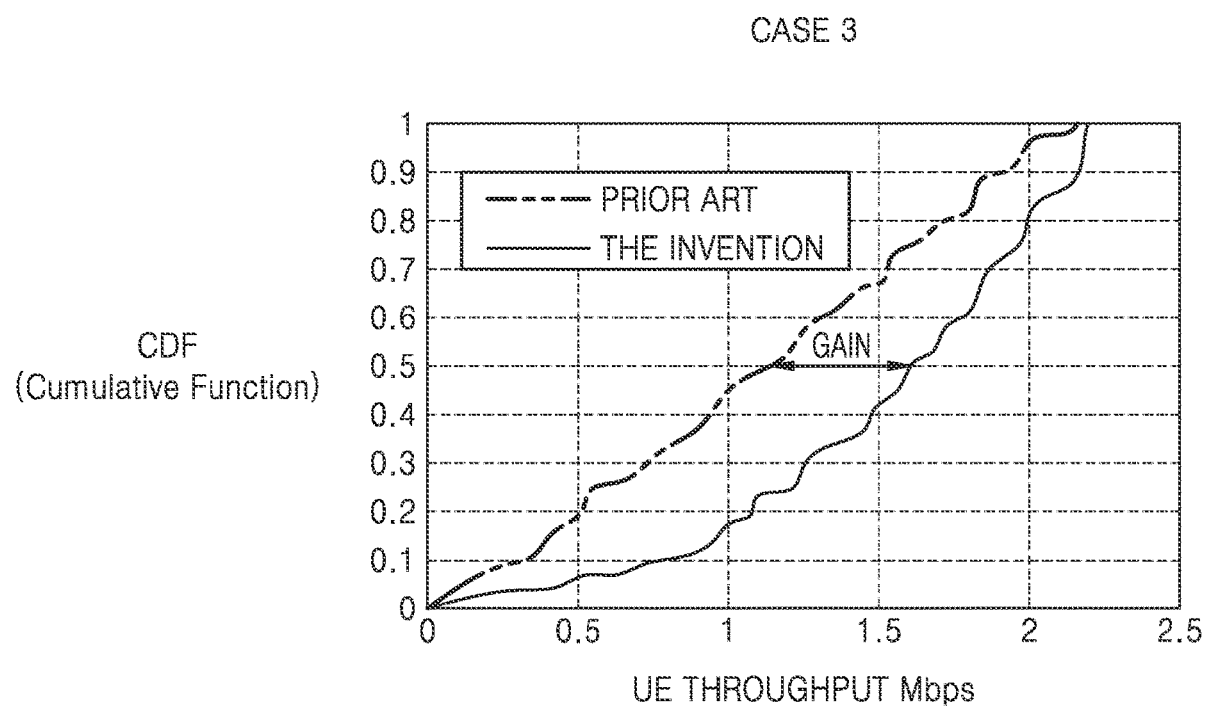

FIGS. 16A, 16B and 16C illustrate graphs of user throughput cumulative distribution function of the three different application scenarios in the simulations of the disclosure, respectively, as shown in FIGS. 15A, 15B and 15C.

FIG. 16A shows the simulation result in the scenario 1, in which the dashed line represents the simulation result of the prior art, the solid line represents the simulation result of the embodiment of the disclosure, the horizontal axis represents user throughput (Mbps, million bits per second), and the vertical axis represents the CDF value. At a fixed CDF point, the greater the user throughput, the better the performance. It can be seen from FIG. 16A that at the same CDF point, the user throughput based on the scheme of the embodiment of the disclosure has been greatly improved, and better the beam coverage gains, comparing with the prior art.

The following table shows the cell performance comparison results in the scenario 1 between the existing scheme and the scheme of the disclosure:

| | Cell performance | | | |
|---|---|---|---|---|
| | Throughput, Mbps | | Gain | |
| Scenario 1 | Cell average throughput | 5% edge user throughput | Cell average throughput | 5% edge user throughput |
| prior art | 166.53 | 0.14 | NA | NA |
| disclosure | 216.06 | 0.36 | 29.7% | 157.1% |

It can be seen from the table that, in the scenario 1, the scheme of the embodiment of the disclosure may be used to select a suitable beam for a coverage area, thereby getting about 30% cell average performance improvement. Although there are no hotspot areas in this scenario, because users are distributed on the ground, these beams with relatively large vertical angle basically have no traffic. Through the method of the embodiment of the disclosure, more beams may be distributed in smaller vertical angle area, or more beams may be distributed in the horizontal dimension, and less and wider beams are used to cover areas with higher vertical angle area, thereby improving beam utilization rate and system performance.

FIG. 16B shows the schematic diagram of the simulation result in the scenario 2. Similarly, the dashed line represents the simulation result of the prior art, and the solid line represents the simulation result of the embodiment of the disclosure. It can be seen from FIG. 16B that, at the same fixed CDF point, the user throughput based on the scheme of the embodiment of the disclosure has been greatly improved, and better the beam coverage gains, comparing with the prior art.

The following table shows the cell performance simulation comparison results in the scenario 2 between the prior art and the scheme of the disclosure:

| | Hotspot performance | |
|---|---|---|
| Scenario 2 | User average throughput, Mbps | Gain |
| prior art | 1.188 | NA |
| disclosure | 1.6226 | 36.6% |

By adopting the scheme of the embodiment in the disclosure, higher density and narrower beam number is applied to the hotspot area, thereby improving reception signal strength of user in the hotspot area. In the scenario 2, because 80% traffic focus in the hotspot area, higher density and narrower beam may better use to cover the hotspot area. It can be seen from the simulation evaluation result in the table that, when applying the scheme of the embodiment of the disclosure, the hotspot area may get 36.6% average performance gain, and cell overall performance has also been obviously improved, comparing with the existing scheme.

FIG. 16C shows the schematic diagram of the simulation result in the scenario 3. Similarly, the dashed line represents the simulation result of the prior art, and the solid line represents the simulation result of the embodiment of the disclosure. It can be seen form FIG. 16C that, at the same CDF point, the user throughput based on the scheme of the embodiment of the disclosure has been greatly improved, and better the beam coverage gains, comparing with the prior art. By comparing FIG. 16A, FIG. 16B, and FIG. 16C, it can be seen that, for hotspot area where the traffic distribution is more concentrated, the gain improvement brought by the scheme of the embodiments of the disclosure is greater, comparing with the prior art. The following table shows the cell performance simulation comparison results in the scenario 3 between the prior art and the scheme of the disclosure:

|           | Hotspot performance          |       |
|-----------|------------------------------|-------|
| Scenario 3 | User average throughput, Mbps | Gain  |
| prior art | 1.1449                       | NA    |
| disclosure | 1.6071                      | 40.4% |

Similar to the scenario 2, based on the scheme of the embodiment of the disclosure, higher density and narrower beam number is applied to the hotspot area, thereby effectively improving reception signal strength of users in the area. In the scenario 3, 90% traffic focus in the hotspot area, and the vertical dimension distribution in the hotspot area is larger, and denser beams may get higher gain. The evaluation results show that the scheme may be applied to get more than 40% performance gain in the hotspot area, while cell overall performance has also been obviously improved.

Based on the same principle as the method shown in FIG. 6 and FIG. 8A, an embodiment of the disclosure further provides a beam controlling apparatus.

Figure 17:
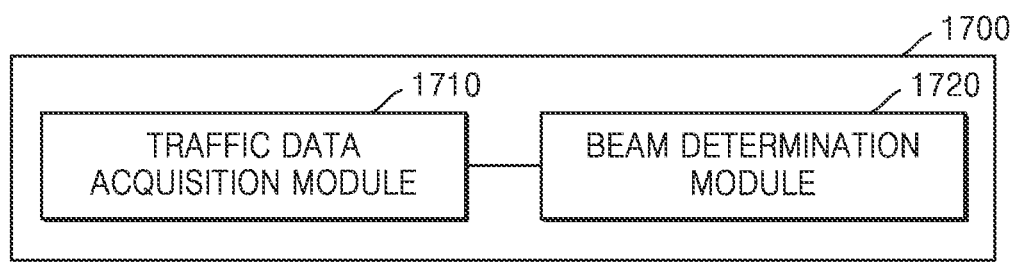
FIG. 17 illustrates a structural diagram of a beam controlling apparatus according to an embodiment.

FIG. 17 illustrates a structural diagram of a beam controlling apparatus according to an embodiment. As shown in FIG. 17, a beam controlling apparatus 1700 includes a traffic data acquisition module 1710 and a beam determination module 1720. The traffic data acquisition module 1710 is configured to obtain traffic distribution data of each beam area in a cell. The beam determination module 1720 is configured to determine beams of the cell according to the traffic distribution data of each beam area.

The beam controlling apparatus 1700 may be a device disposed on the side of base station. The apparatus may be a part of the base station, or may be an independent beam management apparatus communicating with the base station. The beam determination module 1720 is configured to: determine the total number of beams for each beam area according to the traffic distribution data of each beam area; determine beam width of each beam area according to the total number of beams of each beam area; and determine beams of each beam area from candidate beam set based on the beam width of each beam area.

For a beam area, when determining the beam width of the beam area according to the total number of beams for the set area, the beam determination module 1720 is configured to: determine a number of beams arranged in the horizontal direction and a number of beams arranged in the vertical direction for the beam area according to the total number of beams for the beam area and ratio information of the beams arranged in the horizontal direction and the beams arranged in the vertical direction for the beam area; and determine the beam width of the beam area according to coverage range information of the beam area and the number of the beams arranged in the horizontal direction and the number of the beams arranged in the vertical direction for the beam area.

For a beam area, when determining the beams of the beam area from the candidate beam set based on the beam width of the beam area, the beam determination module 1720 is configured to: determine candidate beams of the beam area from the candidate beam set based on the beam width of the beam area; and determine the beams of the beam area from the candidate beams of the beam area based on the distance between the candidate beams and the beam area.

The candidate beam set includes candidate beam subsets divided according to the beam widths; accordingly, when determining the candidate beams of the beam area from the candidate beam set based on the beam width of the beam area, the beam determination module 1720 may be configured to: determine the target beam subset of the beam area from the candidate beam subsets based on the beam width of the beam area and the beam width corresponding to each candidate beam subset, and take beams in the target beam subset as the candidate beams of the beam area.

For a set area, when determining the beams of the set area from the candidate beam set based on the beam width of the beam area, the beam determination module 1720 may be configured to: use the beam area and neighboring beam area of the beam area as an united area if the total number of beams for the beam area is less than a first threshold value, and determine each beam of the united area from the candidate beam set based on the beam width of the united area.

When determining the beams of the united area from the candidate beam set based on the beam width of the united area, the beam determination module 1720 may be configured to: determine the beam width of the united area based on the beam width of each beam area included in the united area; determine candidate beams of the united area from the candidate beam set based on the beam width of the united area; and determine the beams of the united area from the candidate beams based on the distance between the candidate beams and each beam area included in the united area.

The united area may satisfy any one or any combination of the following: the total number of beams for each beam area included in the united area is the same; the beam width of each beam area included in the united area is the same; the total number of beams for each beam area included in the united area is less than a first threshold value; and the sum of the total numbers of beams for all the beam areas included in the united area is less than a second threshold value.

The traffic data acquisition module 1710 may be configured to: obtain area-related information of the cell; and determine the traffic distribution data of each beam area in the cell according to the area-related information of the cell. The area-related information includes environment data and/or location information of the cell.

When determining the traffic distribution data of each beam area in the cell according to the area-related information of the cell, the traffic data acquisition module 1710 may be configured to: predict the traffic distribution data of each beam area through a traffic prediction model according to the area-related information of the cell. The above traffic prediction model may be trained by a model training module through the following ways: obtaining training samples, where the training samples include sample area-related information for various categories of cells and sample traffic distribution data of each beam area in the cell corresponding to the sample area-related information for each category; and training an initial prediction model based on the sample area-related information for the various categories until the predicted traffic distribution data for each category output by the initial prediction model and the sample traffic distribution data corresponding to the category satisfy preset condition, and taking the prediction model at the end of the training as the traffic prediction model.

When obtaining the training samples, the model training module may be configured to: obtain each initial sample data, one piece of initial sample data includes a type of initial area-related information of the cell and initial traffic distribution data of the cell under the initial area-related information, wherein the initial traffic distribution data of one cell includes the traffic distribution data of each beam area in the cell; determine the category of the initial traffic distribution data of the cell in each initial sample data, and obtain classification results of the initial traffic distribution data; label the initial area-related information of the cell corresponding to the initial traffic distribution data with corresponding category label based on the classification results of the initial traffic distribution data, to obtain sample areas-related information; and obtain sample traffic distribution data corresponding to sample historic area-related information of the same category based on the initial traffic distribution data belonging to the same category.

In case that the initial traffic distribution data of the cell includes traffic distribution data corresponding to at least two traffic parameters, when determining the category of the initial traffic distribution data in each initial sample data, the model training module may be configured to: determine correlation between the traffic distribution data of the cell corresponding to the traffic parameter in the two pieces of the initial sample data, respectively, for each traffic parameter, with respect to any two pieces of initial sample data; and determine whether the initial traffic distribution data of the cell in the two pieces of the initial sample data is the same category based on the correlation corresponding to traffic parameters in the two pieces of the initial sample data.

Accordingly, when obtaining the sample traffic distribution data corresponding to the sample historic area-related information of the same category based on the initial traffic distribution data belonging to the same category, the model training module may be configured to: obtain the sample traffic distribution data corresponding to the area-related information of the same category based on the initial traffic distribution data of the traffic parameters belonging to the same category.

For a beam area, when determining the total number of beams for the set area according to the traffic distribution data of the beam area, the beam determination module 120 may be configured to perform any one or any combination of the following: determining the total number of beams for the beam area according to the traffic distribution data of the beam area, and the mapping relationship between the pre-configured traffic distribution data and the beam number; and determining the total number of beams for the beam area according to the traffic distribution data of the beam area and any one or any combination of the following information: total traffic data distribution of all beam areas in the cell, beambook size of the cell, set value of the minimum beam number of the beam area, and set value of the maximum beam number of the beam area.

The ratio information of the beams arranged in the horizontal direction and the beams arranged in the vertical direction for each set area is pre-configured; or, it is determined by any way of the following: determining the ratio information of the beams arranged in the horizontal direction and the beams arranged in the vertical direction for each beam area according to the individual coverage range information of each beam area; and determining the ratio information of the beams arranged in the horizontal direction and the beams arranged in the vertical direction for each beam area according to the coverage range information of all the beam areas in the cell.

Based on the same principle as the method and apparatus provided in the embodiments of the disclosure, an embodiment of the disclosure further provides an electronic device including a processor and a memory. The memory is configured to store a computer program; and the processor is configured to execute the method provided in any embodiment of the disclosure when the computer program is executed.

An embodiment of the disclosure further provides a computer-readable storage medium. The storage medium stores a computer program that, when executed by a processor, the method provided in any of embodiments of the disclosure is implemented.

Figure 18:
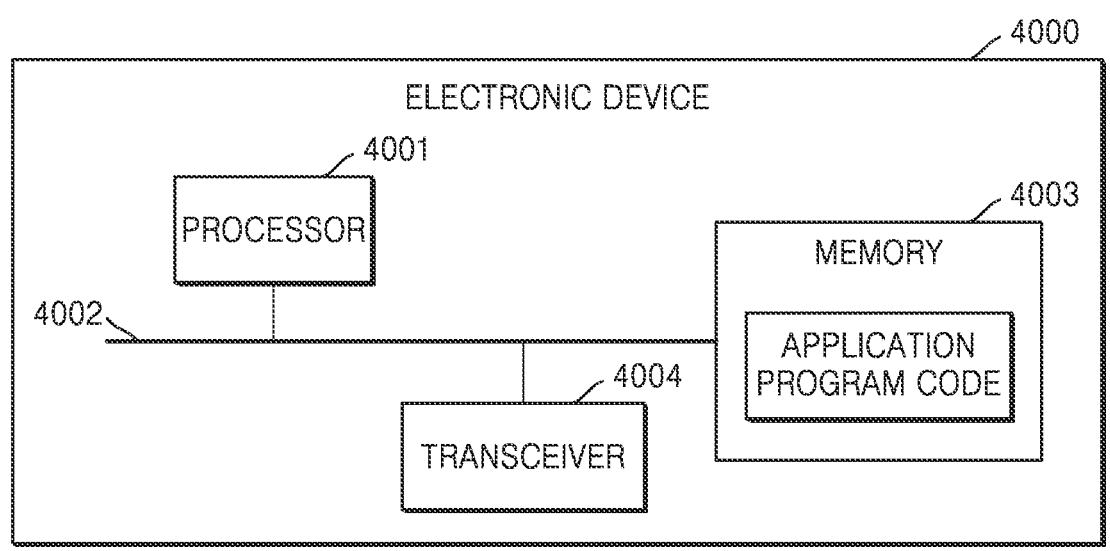
FIG. 18 illustrates a diagram of an electronic device according to an embodiment.

FIG. 18 illustrates a diagram of an electronic device according to an embodiment. As shown in FIG. 18, an electronic device 4000 may include a processor 4001 and a memory 4003. The processor 4001 and the memory 4003 are connected, for example, through a bus 4002. The electronic device 4000 may further include a transceiver 4004. It may be noted that, the transceiver 4004 is not limited to one, and the structure of the electronic device 4000 does not limit the embodiments of the disclosure. The processor 4001 may be a CPU (central processing unit), a general-purpose processor, a DSP (Digital Signal Processor), an ASIC (Application Specific Integrated Circuit), or an FPGA (Field Programmable Gate Array) or other programmable logic devices, transistor logic devices, hardware components or any combination thereof. It may implement or perform various logical blocks, modules, and circuits described in connection with the disclosure of the disclosure. The processor 4001 may also be a combination that realizes computing functions, for example, a combination including one or more microprocessors, a combination of DSP and microprocessor, and the like.

The bus 4002 may include a path for transmitting information between the above components. The bus 4002 may be a PCI (Peripheral Component Interconnect) bus or an EISA (Extended Industry Standard Architecture) bus, or the like. The bus 4002 may be divided into address bus, data bus, control bus, and the like. For ease of representation, only a thick line is used in FIG. 18, but it does not mean that there is only one bus or one type of bus.

The memory 4003 may be ROM (Read Only Memory) or other type of static storage device that may store static information and instructions, RAM (Random Access Memory) or other type of dynamic storage device that may store information and instructions, or EEPROM (Electrically Erasable Programmable Read Only Memory), CD-ROM (Compact Disc Read Only Memory) or other optical disk storage, optical disc storage (including compact discs, laser discs, optical discs, digital versatile discs, blue-ray discs, etc.), magnetic disk storage media or other magnetic storage devices, or any other media that may be used to carry or store desired program code in the form of instructions or data structures and may be accessed by a computer, but not limited to thereto.

The memory 4003 is configured to store application program code for performing the solutions of the disclosure under the control of the processor 4001. The processor 4001 is configured to execute application program code stored in the memory 4003 to implement the solution shown in any one of the foregoing method embodiments.

It may be understood that although the steps in the flowchart of the drawings are sequentially displayed in accordance with the directions of the arrows, these steps are not necessarily performed in the order indicated by the arrows. Unless explicitly stated herein, the performing of these steps is not strictly limited, and they may be performed in other orders. Moreover, at least part of the steps in the flowchart of the drawing may include a plurality of sub-steps or a plurality of stages. These sub-steps or stages are not necessarily performed at the same time, but may be performed at different times, and the order thereof is not necessarily performed sequentially either, but may be performed in turn or alternately with other steps or at least part of the sub-steps or stages of other steps.

Although the disclosure has been described with the embodiments, various changes and modifications may be suggested to one skilled in the art. It is intended that the disclosure encompass such changes and modifications as fall within the scope of the appended claims.

What is claimed is:

1. A method for controlling a beam in a cell, the method comprising:
   obtaining traffic distribution data of a plurality of beam areas included in the cell;
   obtaining a total number of a plurality of beams for a beam area among the plurality of the beam areas, based on the obtained traffic distribution data;
   obtaining a beam width of one among the plurality of beams for the beam area, based on the obtained total number of the plurality of beams;
   obtaining, from a candidate beam set, candidate beams for the beam area, based on the obtained total number of the plurality of beams and the obtained beam width of the one among the plurality of beams; and
   obtaining, from the obtained candidate beams, multiple beams for the beam area, based on a distance between the beam area and each obtained candidate beam of the obtained candidate beams,
   wherein the distance comprises a distance between a center of the beam area and a center of the each obtained candidate beam.

2. The method of claim 1, wherein the obtaining the beam width of the one among the plurality of beams comprises:
   obtaining, for the beam area, a number of beams arranged in a horizontal direction and a number of beams arranged in a vertical direction, based on the obtained total number of the plurality of beams for the beam area, a coverage range information of the beam area and a size of the one among the plurality of beams; and
   obtaining the beam width of the one among the plurality of beams, based on the coverage range information of the beam area and the obtained number of beams arranged in the horizontal direction for the beam area and the obtained number of beams arranged in the vertical direction for the beam area.

3. The method of claim 2, wherein the obtaining the beam width of the one among the plurality of beams further comprises:
   obtaining a horizontal beam width by dividing a horizontal beam area width included in the coverage range information of the beam area by the obtained number of beams arranged in the horizontal direction for the beam area; and
   obtaining a vertical beam width by dividing a vertical beam area width included in the coverage range information of the beam area by the obtained number of beams arranged in the vertical direction for the beam area.

4. The method of claim 1, wherein the obtaining the multiple beams for the beam area comprises obtaining, from the obtained candidate beams, the multiple beams for the beam area, based on a distance between the each obtained candidate beam and a center of the beam area.

5. The method of claim 1, wherein the candidate beam set comprises a plurality of candidate beam subsets having different beam widths, and
   wherein the obtaining the candidate beams for the beam area comprises:
      obtaining, from the plurality of candidate beam subsets, a target beam subset for the beam area by selecting a candidate beam subset having a same beam width as the obtained beam width of the one among the plurality of beams; and
      obtaining, from the obtained target beam subset, the candidate beams for the beam area.

6. The method of claim 1, wherein the obtaining the candidate beams for the beam area comprises:
   based on the obtained total number of the plurality of beams for the beam area being less than one, combining the beam area with one or more neighboring beam areas to obtain a united beam area; and
   obtaining, from the candidate beam set, candidate beams for the obtained united beam area, based on a beam width of the obtained united beam area.

7. The method of claim 6, wherein the obtaining the multiple beams for the beam area comprises obtaining, from the obtained candidate beams, one beam for the obtained united beam area, based on a distance between the each obtained candidate beam and a center of the obtained united beam area.

8. The method of claim 6, wherein the obtaining the candidate beams for the obtained united beam area comprises obtaining, as the candidate beams from the obtained united beam area, a candidate beam subset having a same beam width with the beam width of the obtained united beam area.

9. The method of claim 1, wherein the obtaining the traffic distribution data comprises:
   obtaining area-related information of the cell; and
   obtaining the traffic distribution data of the plurality of beam areas included in the cell, based on to the obtained area-related information of the cell.

10. The method of claim 9, wherein the area-related information comprises any one or any combination of environment data and location information of the cell.

11. The method of claim 9, wherein the obtaining the traffic distribution data further comprises predicting the traffic distribution data of the plurality of beam areas included in the cell, through a traffic prediction model based on the obtained area-related information of the cell.

12. The method of claim 11, wherein the traffic prediction model is trained by:
   obtaining training samples comprising a sample of area-related information for a plurality of categories of cells, and a sample of traffic distribution data for each of the plurality of beam areas in the cell corresponding to the sample of area-related information for each of the plurality of categories; and
   training an initial prediction model, based on the sample of area-related information for the plurality of categories, until the predicted traffic distribution data for each of the plurality of categories that is output by the initial prediction model and the sample of traffic distribution data corresponding to a respective one of the plurality of categories satisfy preset condition, to obtain the traffic prediction model.

13. The method of claim 12, wherein the obtaining the training samples comprises:
   obtaining initial sample data, wherein each piece of the initial sample data comprises a type of initial area-related information of the cell and initial traffic distribution data of the cell under the initial area-related information, and the initial traffic distribution data of the cell comprises the traffic distribution data of the plurality of beam areas included in the cell;

obtaining a category of the initial traffic distribution data of the cell in each piece of the obtained initial sample data, to obtain classification results of the initial traffic distribution data;

labeling the initial area-related information of the cell corresponding to the initial traffic distribution data with a corresponding category label, based on the obtained classification results of the initial traffic distribution data, to obtain the sample of area-related information; and obtaining sample traffic distribution data corresponding to sample historic area-related information of the same category, based on the initial traffic distribution data belonging to the same category.

14. The method of claim 13, wherein, based on the initial traffic distribution data of the cell comprising traffic distribution data corresponding to at least two traffic parameters, the determining the category of the initial traffic distribution data of the cell in each piece of the initial sample data comprises:

obtaining a correlation between the traffic distribution data of the cell corresponding to a traffic parameter in two pieces of the initial sample data, respectively, for each of the at least two traffic parameters, with respect to any two pieces of the initial sample data; and identifying whether the initial traffic distribution data of the cell in the two pieces of the initial sample data is the same category, based on the obtained correlation corresponding to the traffic parameter in the two pieces of the initial sample data, respectively, for each of the at least two traffic parameters, and wherein the obtaining the sample traffic distribution data corresponding to the sample historic area-related information of the same category comprises obtaining the sample traffic distribution data corresponding to the sample historic area-related information of the same category, based on the initial traffic distribution data of the cell in the two pieces of the initial sample data belonging to the same category.

15. The method of claim 1, wherein the determining the total number of the plurality of beams for the beam area comprises:

determining the total number of the plurality of beams for the beam area, based on the obtained traffic distribution data of the beam area, and a mapping relationship between a pre-configured traffic distribution data and a beam number; or determining the total number of the plurality of beams for the beam area, based on the obtained traffic distribution data of the beam area and any one or any combination of total traffic data distribution of all beam areas in the cell, a beambook size of the cell, a set value of a minimum beam number of the beam area, and a set value of a maximum beam number of the beam area.

16. An apparatus for controlling a beam in a cell, the apparatus comprises:

a memory storing one or more instructions; and at least one processor configured to execute the one or more instructions to:

obtain traffic distribution data of a plurality of beam areas included in the cell;

obtain a total number of a plurality of beams for a beam area among the plurality of the beam areas, based on the obtained traffic distribution data;

obtain a beam width of one among the plurality of beams for the beam area, based on the obtained total number of the plurality of beams;

obtain, from a candidate beam set, candidate beams for the beam area, based on the obtained total number of the plurality of beams and the obtained beam width of the one among the plurality of beams; and obtain, from the obtained candidate beams, multiple beams for the beam area, based on a distance between the beam area and each candidate beam of the obtained candidate beams, wherein the distance comprises a distance between a center of the beam area and a center of the each obtained candidate beam.

17. The apparatus of claim 16, wherein the at least one processor is further configured to:

obtain, for the beam area, a number of beams arranged in a horizontal direction and a number of beams arranged in a vertical direction, based on the obtained total number of the plurality of beams for the beam area, coverage range information of the beam area and a size of the one among the plurality of beams; and obtain the beam width of the one among the plurality of beams, based on the coverage range information of the beam area and the obtained number of beams arranged in the horizontal direction for the beam area and the obtained number of beams arranged in the vertical direction for the beam area.

18. The apparatus of claim 16, wherein the at least one processor is further configured to:

obtain a horizontal beam width by dividing a horizontal beam area width included in the coverage range information of the beam area by the obtained number of beams arranged in the horizontal direction for the beam area; and obtain a vertical beam width by dividing a vertical beam area width included in the coverage range information of the beam area by the obtained number of beams arranged in the vertical direction for the beam area.

19. The apparatus of claim 16, wherein the at least one processor is further configured to obtain, from the obtained candidate beams, the multiple beams for the beam area, based on a distance between the each obtained candidate beam and a center of the beam area.

20. A non-transitory recording medium having recorded thereon a program, which when executed by an apparatus for controlling a beam in a cell, causes the apparatus to:

obtain traffic distribution data of a plurality of beam areas included in the cell;

obtain a total number of a plurality of beams for a beam area among the plurality of the beam areas, based on the obtained traffic distribution data;

obtain a beam width of one among the plurality of beams for the beam area, based on the obtained total number of the plurality of beams;

obtain, from a candidate beam set, candidate beams for the beam area, based on the obtained total number of the plurality of beams and the obtained beam width of the one among the plurality of beams; and obtain, from the obtained candidate beams, multiple beams for the beam area, based on a distance between the beam area and each candidate beam of the obtained candidate beams wherein the distance comprises a distance between a center of the beam area and a center of the each obtained candidate beam.

\* \* \* \* \*